United States Patent
Miguchi et al.

(10) Patent No.: US 8,193,724 B2
(45) Date of Patent: Jun. 5, 2012

(54) POWER SUPPLY APPARATUS

(75) Inventors: Mitsuaki Miguchi, Kyoto (JP); Taisuke Chida, Kyoto (JP); Go Ezaki, Kyoto (JP)

(73) Assignee: Rohm Co., Ltd. (JP)

( * ) Notice: Subject to any disclaimer, the term of this patent is extended or adjusted under 35 U.S.C. 154(b) by 879 days.

(21) Appl. No.: 11/883,038

(22) PCT Filed: Jan. 25, 2006

(86) PCT No.: PCT/JP2006/301162
§ 371 (c)(1),
(2), (4) Date: Oct. 27, 2008

(87) PCT Pub. No.: WO2006/080364
PCT Pub. Date: Aug. 3, 2006

(65) Prior Publication Data
US 2009/0085538 A1    Apr. 2, 2009

(30) Foreign Application Priority Data

Jan. 25, 2005 (JP) ................. 2005-016917
Jun. 21, 2005 (JP) ................. 2005-180928
Jul. 11, 2005 (JP) ................. 2005-201103

(51) Int. Cl.
G05F 1/00 (2006.01)
H05B 39/04 (2006.01)
H03M 1/02 (2006.01)

(52) U.S. Cl. .............. 315/291; 315/308; 341/108

(58) Field of Classification Search .......... 341/108, 341/110, 118, 115, 117, 126, 144, 155; 315/291, 315/307–308
See application file for complete search history.

(56) References Cited

U.S. PATENT DOCUMENTS

| 6,163,494 | A * | 12/2000 | Nork ............... | 365/226 |
| 6,388,506 | B1 * | 5/2002 | Voo ................. | 327/536 |
| 6,559,710 | B2 * | 5/2003 | Matsuoka ........ | 327/537 |
| 6,633,247 | B2 * | 10/2003 | Yakabe ............ | 341/138 |

(Continued)

FOREIGN PATENT DOCUMENTS

JP   4-170225   6/1992

(Continued)

OTHER PUBLICATIONS

International Preliminary Report on Patentability for International Application No. PCT/JP2006/301162 mailed Jul. 31, 2007.

(Continued)

*Primary Examiner* — Douglas W Owens
*Assistant Examiner* — Minh D A
(74) *Attorney, Agent, or Firm* — Cantor Colburn LLP

(57) ABSTRACT

In the power supply apparatus which performs voltage conversion of an input voltage (Vbat), with a predetermined set voltage as a target value, and outputs the converted voltage, a boost ratio setting unit sets a boost ratio (XCP) of the charge pump circuit based on the input voltage (Vbat) and a predetermined set voltage. A voltage adjustment unit is a regulator circuit, and adjusts voltage (Vx) so that output voltage (Vout) of the charge pump circuit approaches the set voltage. An output voltage setting unit generates a predetermined set voltage as a digital value (Dset). An A/D converter performs analog-digital conversion of the input voltage (Vbat). The boost ratio setting unit sets the boost ratio based on a result of comparing an input voltage (Ddet) that has undergone analog-digital conversion, and the set voltage (Dset).

20 Claims, 9 Drawing Sheets

U.S. PATENT DOCUMENTS

| | | | |
|---|---|---|---|
| 6,717,559 B2 * | 4/2004 | Weindorf | 345/82 |
| 6,812,776 B2 * | 11/2004 | Henry | 327/536 |
| 7,026,796 B2 * | 4/2006 | Suzuki | 323/224 |

FOREIGN PATENT DOCUMENTS

| | | |
|---|---|---|
| JP | 5-111241 | 4/1993 |
| JP | 6-78527 | 3/1994 |
| JP | 2002-111786 | 4/2002 |
| JP | 2002-158096 | 5/2002 |
| JP | 2003-33005 | 1/2003 |
| JP | 2004-235046 | 8/2004 |

OTHER PUBLICATIONS

International Search Report for International Application No. PCT/JP2006/301162 mailed Apr. 25, 2006.

Notification of Reason(s) for Refusal for Japanese Patent Application No. 2005-201103 dispatched Jun. 15, 2010 with English translation.

* cited by examiner

| Iout(mA) | 0~50 | 50~100 | 100~150 | 150~200 |
|---|---|---|---|---|
| Dm(V) | 0.2 | 0.4 | 0.6 | 0.8 |

POWER SUPPLY APPARATUS

CROSS REFERENCE TO RELATED APPLICATIONS

This is a U.S. national stage of application No. PCT/JP2006/301162, filed on 25 Jan. 2006. Priority under 35 U.S.C. §119(a) and 35 U.S.C. §365(b) is claimed from Japanese Application No. 2005-016917, filed 25 Jan. 2005, Japanese Application No. 2005-180928, filed 21 Jun. 2005, and from Japanese Application No. 2005-201103, filed 11 Jul. 2005, the disclosure of which is also incorporated herein by reference.

FIELD OF THE INVENTION

The present invention relates to a power supply apparatus, and in particular, to control technology for a charge pump circuit whose boost ratio can be switched.

DESCRIPTION OF THE RELATED ART

In recent years, among small sized information terminals such as mobile telephones, PDAs (Personal Digital Assistants) and the like, there are devices in which a voltage is required that is higher than an output voltage of a battery, as in, for example, a Light Emitting Diode (referred to as LED below) used as a backlight for liquid crystal, and the like. In many of these small sized information terminals, Li-ion batteries are used; the output voltage thereof is normally about 3.5 V, and, when fully charged, about 4.2 V, but the LED requires, as a drive voltage thereof, a voltage higher than the battery voltage. In this way, in cases in which a voltage higher than the battery voltage is required, the battery voltage is boosted using a boosting power supply apparatus that uses a charge pump circuit or the like, and a voltage required to drive a load circuit, such as the LED or the like, is obtained.

Patent Document 1 discloses technology related to a charge pump circuit for which a plurality of boost ratios can be switched. By using such a charge pump circuit in which a plurality of boost ratios can be switched, even in cases in which battery voltage changes due to battery exhaustion or charging, by setting an appropriate boost ratio, it is possible to supply a more desirable voltage to the load circuit.

Cases are now considered in which the charge pump circuit boosts the battery voltage, which is an input voltage, at a boost ratio of ×1.5 or ×2. In order that the charge pump circuit multiplies the input voltage by the boost ratio and outputs the voltage, in cases in which it is desired to stabilize the output voltage at a predetermined value, it is necessary to provide a regulator circuit on an input side of the charge pump circuit and adjust input voltage thereof. That is, when the voltage that is to be applied to the load circuit is 4.5 V, and the boost ratio is ×1.5 and ×2, the input voltage of the charge pump circuit must be adjusted by the regulator circuit to 3 V and 2.25 V respectively.

Patent Document 1: Japanese Patent Application, Laid Open No. H6-78527

Here, a method of setting the boost ratio of the charge pump circuit is examined. As the method of setting the boost ratio of the charge pump circuit, a method is considered in which output voltage of the charge pump circuit is monitored. In such cases, the output voltage is monitored and when it goes below a predetermined set value, the boost ratio is set one level higher.

However, as described above, a plurality of combinations can be considered for the boost ratio and the input voltage, with respect to a target value of the output voltage of a certain charge pump circuit. For example, when the battery voltage is 3 V, both in cases in which the battery voltage is boosted, as it is, at a boost ratio of ×1.5, and in cases in which the battery voltage is boosted to be twice as high after being dropped by the regulator circuit to 2.25 V, an output voltage of 4.5 V can be obtained. However, since, in general, efficiency of the charge pump circuit decreases as the boost ratio becomes high, the efficiency deteriorates more with the latter.

In addition, cases are considered in which the output voltage of the charge pump circuit is changed with time, for example, alternately outputting a high voltage and a low voltage. When the high voltage is outputted after outputting the low voltage, in cases in which the output voltage is monitored, there is a possibility that the boost ratio will be set unnecessarily high.

In this way, when setting the boost ratio of the charge pump circuit, in cases in which the output voltage is monitored, there is a risk that the efficiency will be needlessly worsened.

Furthermore, in cases in which the output voltage of the charge pump circuit is turned ON and OFF time-wise, there is a problem in that the boost ratio cannot be properly set, in a period until the output voltage of the charge pump circuit is stabilized.

SUMMARY OF THE INVENTION

The present invention has been done in light of these problems, and a general purpose thereof is the provision of a power supply apparatus in which it is possible to appropriately set a boost ratio of a charge pump circuit, and the provision of an electronic device using the power supply apparatus.

First Group Of Embodiments

An embodiment of the present invention relates to a power supply apparatus. The power supply apparatus, which performs voltage conversion of an input voltage, with a predetermined voltage as a target value, and outputs the converted voltage, includes: a charge pump circuit in which a plurality of boost ratios can be switched, a boost ratio setting unit which sets a boost ratio of the charge pump circuit based on the input voltage and a set voltage defining the target value, and a voltage adjustment unit which adjusts the input voltage so that the output voltage of the charge pump circuit approaches the predetermined voltage, and outputs to the charge pump circuit.

According to this embodiment, it is possible to appropriately set the boost ratio based on the input voltage to the power supply apparatus.

The power supply apparatus may further be provided with an output voltage setting unit which outputs the set voltage as a digital value, and an A/D converter which performs analog-digital conversion of the input voltage, and the boost ratio setting unit may set the boost ratio based on a result of comparing the input voltage that has undergone analog-digital conversion, and the predetermined voltage.

By performing the setting of the boost ratio by digital signal processing, it is possible to easily perform control of the output voltage, and the like.

The voltage adjustment unit may include a transistor arranged between a terminal to which the input voltage is applied and an input terminal of the charge pump circuit, and an error amplifier which adjusts voltage of a control terminal of the transistor based on an error voltage between the output voltage and the set voltage.

By adjusting the voltage inputted to the charge pump circuit by a regulator circuit, the output voltage can be made to approach a predetermined set voltage with good accuracy. The control terminal of the transistor is called a gate terminal when an FET (Field Effect Transistor) is used, and a base terminal when a bipolar transistor is used.

The transistor may be configured as a discrete component.

Furthermore, the transistor may be configured as a separate package from other circuit elements that constitute the power supply apparatus.

By arranging the transistor as a discrete component, or in a separate package integrated circuit, it is possible to disperse generated heat.

Another embodiment of the present invention is a electronic device. The electronic device is provided with a load circuit, the abovementioned power supply apparatus which drives the load circuit, and a drive controller which is arranged on a driving path of the load circuit and performs pulse modulation of a current flowing in the load circuit.

In cases in which the current flowing in the load circuit is pulse-modulated, and a driving state thereof is controlled by a duty ratio, by arranging the boost ratio based on the input voltage, not on output of the charge pump circuit, it is possible to appropriately set the boost ratio.

The load circuit may be a light emitting element, and the drive controller may control light emission intensity thereof.

The light emitting element is an LED, an organic EL (Electroluminescent) device, or the like. Even with an electronic device which performs pulse modulation of current flowing in the light emitting element and adjusts light intensity, it is possible to perform a boosting operation at an appropriate boost ratio, and to drive the light emitting element.

The load circuit may be a plurality of light emitting elements, and the drive controller may independently control the light emission intensity of each light emitting element.

Second Group Of Embodiments

In an embodiment of the present invention, an A/D converter, which converts an inputted analog signal into a digital signal, is provided with a selector which selects one reference voltage from a plurality of reference voltages, and an A/D conversion unit which converts the inputted analog signal into a digital signal based on the reference voltage selected by the selector.

According to this embodiment, by providing the selector which selects the one reference voltage from the plurality of reference voltages, it is possible to select the reference voltage according to a value of the inputted analog signal. Since it is possible to perform A/D conversion at a reference voltage appropriate to a value of the inputted analog signal, conversion accuracy can be improved.

Another embodiment of the present invention is an A/D converter. This A/D converter, which switches a plurality of inputted analog signals in a time division manner, to convert the signals into digital signals, is provided with a first selector which selects one analog signal from the plurality of analog signals, a second selector which operates in response to the first selector, and selects one reference voltage from the plurality of reference voltages, and an A/D conversion unit which converts the analog signal selected by the first selector into a digital signal based on the reference voltage selected by the second selector.

According to this embodiment, by providing the second selector which selects the one reference voltage from the plurality of reference voltages, it is possible to switch the reference voltage of the A/D conversion unit, in accordance with selection switching of the plurality of analog signals by the first selector, to perform A/D conversion. Since it is possible to set separate reference voltages for the plurality of analog input signals, it is possible to perform A/D conversion using a reference voltage appropriate to a voltage fluctuation range of each of the analog signals, and conversion accuracy can be improved.

The selection switching of the analog signals and the reference voltages may be performed by providing a control signal to the first selector and the second selector. In such cases, it is possible to control timing of selection switching of the analog signals and the reference voltages.

The first selector and the second selector may be provided with an analog switch that is switched ON and OFF by a control signal. In such cases, the first selector and the second selector can be formed with a simple configuration.

Another embodiment of the present invention is a power supply apparatus. The apparatus, which is a power supply apparatus that performs voltage conversion of an input voltage, with a predetermined voltage as a target value, and outputs the converted voltage, is provided with: the abovementioned A/D converter which performs A/D conversion with the input voltage as at least one of the plurality of analog signals, a charge pump circuit in which a plurality of boost ratios can be switched, a third selector which operates in response to the first selector and the second selector and which switches between a digital signal which expresses the input voltage that is outputted from the A/D converter, and a digital signal which expresses an analog signal that is inputted to the power supply apparatus outside of the input voltage, a boost ratio setting unit which sets a boost ratio of the charge pump circuit based on the digital signal which expresses the input voltage selected by the third selector and the digital signal which expresses a set voltage that defines the target value, and a voltage adjustment unit which adjusts the input voltage so that output voltage of the charge pump circuit approaches a predetermined voltage, and which outputs to the charge pump circuit.

According to this embodiment, it is possible to appropriately set the boost ratio based on the input voltage to the power supply apparatus, to output the voltage adjusted to the predetermined target value, and also to perform A/D conversion of the analog signal outside of the boosted input voltage, and output the signal. Even in cases in which a voltage fluctuation range of the boosted input voltage and a voltage fluctuation range of the analog signal outside of this, are different, since it is possible to respectively select separate reference voltages, even in cases in which the same A/D converter is used, it is possible to ensure high conversion accuracy.

Another embodiment of the present invention is an electronic device. The device is provided with a load circuit, a sensor which outputs an analog signal, and the abovementioned power supply apparatus which outputs a voltage, adjusted to a predetermined target value, to the load circuit, and outputs a digital signal for which an analog signal inputted from the sensor underwent A/D conversion.

According to this embodiment, it is possible to perform A/D conversion of the analog signal inputted from the sensor, using the A/D converter used in the power supply apparatus, and to output the signal. Even in cases in which voltage fluctuations of the analog signal from the sensor are small, since it is possible to perform A/D conversion with high accuracy, there is no need to prepare a separate A/D converter for the sensor, and it is possible to configure a small-sized, low-cost electronic device.

The load circuit may be a light emitting element. The light emitting element is a Light Emitting Diode (LED), an organic EL (Electroluminescent) device, or the like. In such cases, it is possible to configure a light emitting device.

The sensor may be a temperature sensor. In such cases, it is possible to output a digital signal for which A/D conversion has been performed on an analog signal from the temperature sensor, to a control circuit in which control is performed using temperature information.

Third Group Of Embodiments

In order to solve the abovementioned problems, a power supply apparatus according to an embodiment of the present invention is provided with a boosting circuit which boosts an input voltage applied to an input terminal, and supplies the boosted voltage to a load, and a boost ratio setting unit which sets a boost ratio based on the input voltage, a target value of voltage supplied to the load, and a current flowing in the load, and the boosting circuit switches the boost ratio based on the setting.

Preferably, the power supply apparatus is further provided with a register circuit which outputs, to the boost ratio setting unit, a voltage drop value based on a current amount flowing in the load, occurring across a predetermined section in a path from the input terminal to the load, and the boost ratio setting unit sets the boost ratio based on the input voltage, a target value of the voltage supplied to the load, and the voltage drop value.

More preferably, the register circuit notifies the boost ratio setting unit of the voltage drop value in the boosting circuit based on the current amount.

Preferably, the load is a light emitting element used as a backlight of an LCD display device.

Furthermore, a mobile information terminal according to an embodiment of the present invention is a mobile information terminal having a power supply apparatus, and the power supply apparatus is provided with a boosting circuit which boosts input voltage, and supplies the boosted voltage to the load, and a boost ratio setting unit which sets a boost ratio based on the input voltage, a target value of the voltage supplied to the load, and a current flowing in the load, and the boosting circuit switches the boost ratio based on the setting.

Furthermore, a power supply apparatus according to an even further embodiment of the present invention is provided with a voltage adjustment unit which adjusts input voltage applied to an input terminal, a boosting circuit which boosts the adjusted voltage and supplies the boosted voltage to a load, and a boost ratio setting unit which sets a boost ratio of the boosting circuit, and the boosting circuit performs output according to the adjusted voltage and the setting of the boost ratio setting unit.

Preferably, the power supply apparatus is further provided with an output voltage setting unit which sets a target value of the voltage supplied to the load, and the boost ratio setting unit sets the boost ratio based on the setting of the output voltage setting unit.

Preferably, the power supply apparatus is further provided with a conversion table which stores margin voltage corresponding to the current flowing in the load; the boost ratio setting unit sets the boost ratio so that a value which is: the margin voltage subtracted from a voltage value that is the voltage adjusted by the voltage adjustment unit times the boost ratio, does not go below the target value of the voltage supplied to the load; and the voltage adjustment unit adjusts the input voltage so that the output voltage of the boosting circuit becomes the target value of the voltage supplied to the load.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

First Embodiment

Figure 1:
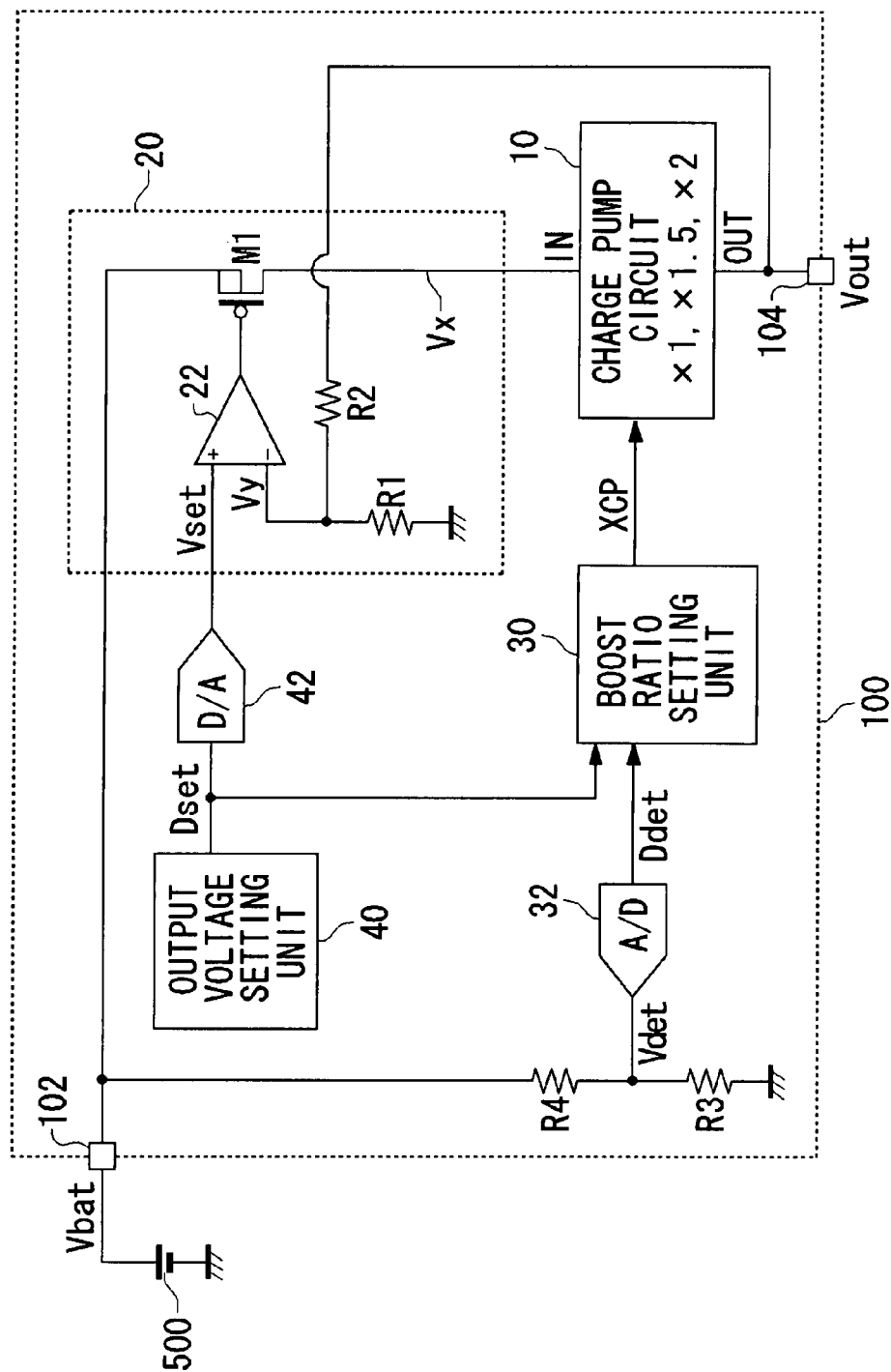
FIG. 1 is a circuit diagram showing a configuration of a power supply apparatus according to a first embodiment.

FIG. 1 is a circuit diagram showing a configuration of a power supply apparatus 100 according to a first embodiment of the present invention. This power supply apparatus 100 is installed in a small sized information terminal that is driven by a battery 500, and with a battery voltage Vbat outputted from the battery 500 as an input voltage, the battery voltage Vbat is boosted and voltage necessary for driving a load circuit is generated.

As input and output terminals, the power supply apparatus 100 is provided with an input terminal 102 and an output terminal 104. The battery voltage Vbat outputted from the battery 500 is applied to the input terminal 102. A load circuit, not shown in the figure, is connected to the output terminal 104. The power supply apparatus 100 boosts the battery voltage Vbat applied to the input terminal 102, and outputs an output voltage Vout from the output terminal 104.

The power supply apparatus 100 includes a charge pump circuit 10, a voltage adjustment unit 20, a boost ratio setting unit 30, an output voltage setting unit 40, an A/D converter 32, a D/A converter 42, and resistors R3 and R4.

The charge pump circuit 10 switches a plurality of boost ratios, by changing the number of stages of the charge pump circuit, is configured so that the outputted voltage can be changed, boosts voltage Vx inputted to an input terminal IN by a specified boost ratio, and outputs from an output terminal OUT thereof. The output terminal OUT of the charge pump circuit 10 forms, as it is, the output terminal of the power supply apparatus 100. In the present embodiment, the boost ratio of the charge pump circuit 10 can be switched between any of ×1, ×1.5, and ×2.

The output voltage Vout=V1 x×XCP is outputted from the output terminal 104 of the power supply apparatus 100, that is, the output terminal OUT of the charge pump circuit 10, with the boost ratio thereof being XCP.

The output voltage setting unit 40 generates the output voltage Vout to be supplied by the power supply apparatus 100 to the load circuit, as a digital value Dset, based on data stored in ROM (Read Only Memory) or data inputted from outside. The D/A converter 42 performs digital-analog conversion of the digital value Dset outputted from the output voltage setting unit 40, and outputs a set voltage Vset, that is an analog value, to the voltage adjustment unit 20. Furthermore, the digital value Dset generated by the output voltage setting unit 40 is inputted to the boost ratio setting unit 30.

The voltage adjustment unit 20, which is a regulator circuit, drops the battery voltage Vbat applied to the input terminal 102, as necessary, and outputs to the input terminal IN of the charge pump circuit 10. The voltage adjustment unit 20 includes a transistor M1, an operational amplifier 22, and resistors R1 and R2.

The set voltage Vset outputted from the boost ratio setting unit 30 is applied to a non-inverting input terminal of the operational amplifier 22, and the output voltage Vout is divided by the resistors R1 and R2, and is applied to an inverting input terminal.

The transistor M1 is a MOSFET (Metal Oxide Semiconductor Field Effect Transistor), and is arranged between the input terminal 102 of the power supply apparatus 100 and the input terminal IN of the charge pump circuit 10. An output terminal of the operational amplifier 22 is connected to a gate terminal, which is a control terminal of the transistor M1. The voltage adjustment unit 20 adjusts an ON resistance by voltage applied to the gate terminal of the transistor M1, and adjusts voltage of a drain terminal, that is, voltage Vx of the input terminal IN of the charge pump circuit 10.

In the voltage adjustment unit 20, the operational amplifier 22 adjusts the voltage of the gate terminal of the transistor M1 so that two voltages inputted to the inverting input terminal and the non-inverting input terminal become equal. Here, the set voltage Vset is applied to the non-inverting input terminal of the transistor M1, and a voltage Vy=Vout×R1/(R1+R2) is applied to the inverting input terminal. When feedback by the operational amplifier 22 makes Vset=Vy, and the ON resistance of the transistor M1 is adjusted, the output voltage is stabilized so that Vout=Vset×(R1+R2)/R1. At this time, the voltage Vx of the input terminal IN of the charge pump circuit 10 is stabilized to approach Vx=Vout/XCP=Vset×(R1+R2)/R1/XCP.

The resistors R3 and R4 divide the battery voltage Vbat applied to the input terminal 102 of the power supply apparatus 100, and output to the A/D converter 32. A detection voltage Vdet=Vbat×R3/(R3+R4) is inputted to the A/D converter 32.

The A/D converter 32 performs analog-digital conversion of the detection voltage Vdet obtained by dividing the battery voltage Vbat, and outputs a digital value Ddet to the boost ratio setting unit 30.

The digital value Ddet expressing the battery voltage Vbat, and Dset which specifies a set value of the output voltage Vout are inputted to the boost ratio setting unit 30. The boost ratio setting unit 30, by comparing the two digital values Dset and Ddet, compares the battery voltage Vbat and the set value of the output voltage Vout (below, referred to as output voltage set value Vout'), and based on a comparison result thereof, sets a boost ratio XCP of the charge pump circuit 10.

The boost ratio setting unit 30 sets the boost ratio XCP by, for example, the following type of processing. The boost ratio setting unit 30, by comparing the digital values Dset and Ddet, compares the battery voltage Vbat and the output voltage set value Vout'. When a result thereof is Vbat>Vout', the boost ratio XCP is set to ×1. Furthermore, when Vbat>⅔×Vout', the boost ratio XCP is set to ×1.5. Moreover, when Vbat>½×Vout', the boost ratio XCP is set to ×2. The boost ratio setting unit 30 specifies the boost ratio XCP set in this way, to the charge pump circuit 10.

Figure 2:
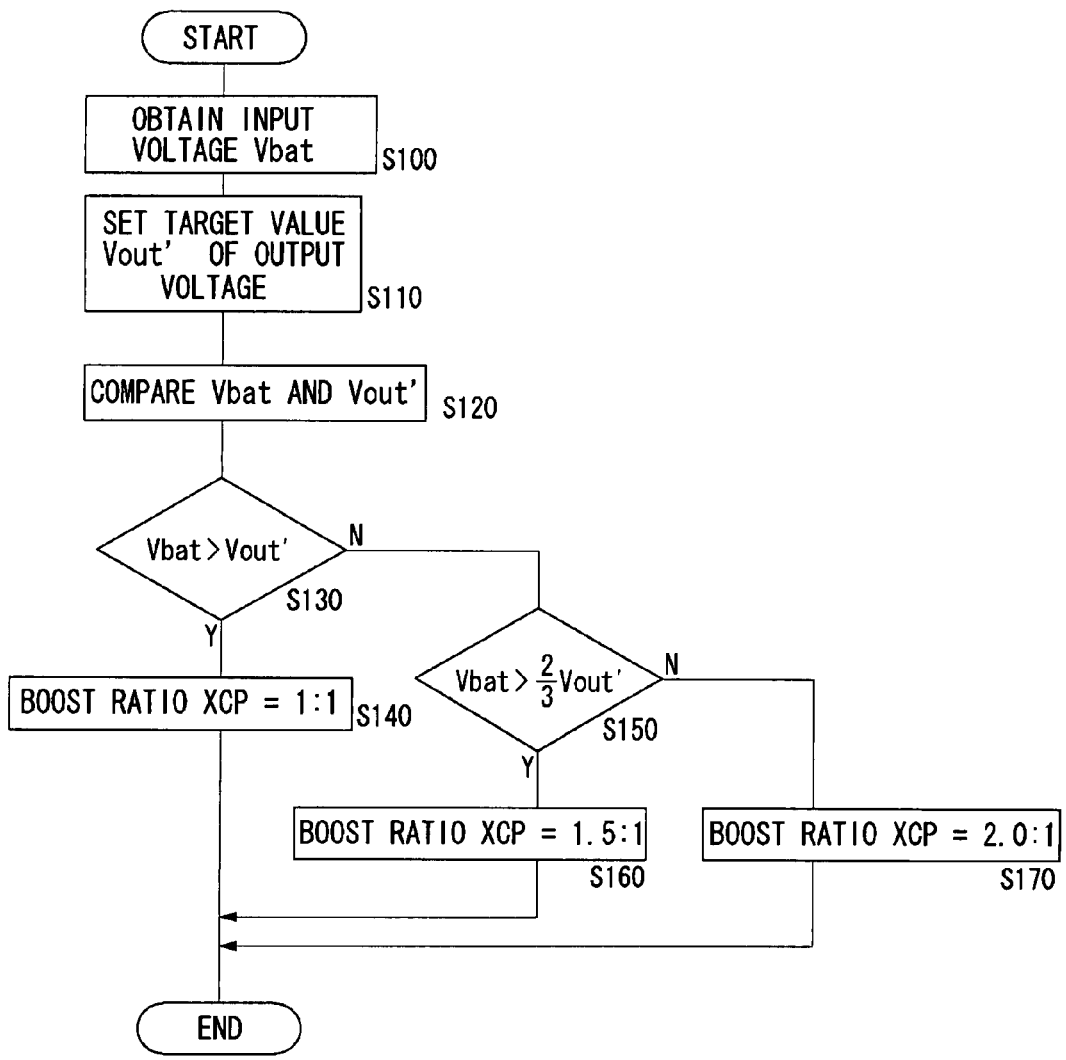
FIG. 2 is a flow chart showing a setting procedure for a boost ratio of a boost ratio setting unit of FIG. 1.

An explanation will be given concerning operation of the power supply apparatus 100 configured as above. FIG. 2 is a flow chart showing a setting procedure of the boost ratio XCP of the boost ratio setting unit 30 in the power supply apparatus 100.

First, analog-digital conversion of the battery voltage Vbat is performed by the A/D converter 32, and a voltage value thereof is obtained as the digital value Ddet (S100).

Next, in the output voltage setting unit 40, the output voltage set value Vout', which is the set value of the output voltage Vout, is generated, and outputted as the digital value Dset (S110). The order of processing shown in S100 and S110 may be reversed.

The boost ratio setting unit 30 starts comparison processing of the battery voltage Vbat and the output voltage set value Vout' based on the set digital values Ddet and Dset, obtained in S100 and S110 (S120).

When Vbat>Vout' (Y in S130), the boost ratio XCP is set to ×1 (S140). When Vbat<Vout' (N in S130), the battery voltage Vbat and a voltage ⅔×Vout' are compared, and when Vbat>⅔×Vout' (Y in S150), the boost ratio XCP is set to ×1.5 (S160).

When Vbat<⅔×Vout' (N in S150), the boost ratio XCP is set to ×2.

For example, the battery voltage Vbat is 3.6 V, and the output voltage set value Vout' is 4.7 V. At this time, since 3.6 V>⅔×4.7 V holds, by the abovementioned procedure in the boost ratio setting unit 30, the boost ratio XCP is set to be ×1.5.

When the boost ratio of the charge pump circuit 10 is set to ×1.5 and the boosting operation is started, the input voltage Vx of the charge pump circuit 10 is controlled to be fed back, by the voltage adjustment unit 20, so that Vx=4.7/1.5=3.13 V, and is stabilized.

As a result, the output voltage Vout of the power supply apparatus 100 is stabilized at 4.7 V, which is the output voltage set value Vout'.

In this way, according to the power supply apparatus 100 according to the present embodiment, since the boost ratio is decided by directly referring to the battery voltage Vbat, even in cases in which the battery voltage Vbat changes, it is possible to set an appropriate boost ratio. As a result, a problem in which the boost ratio is set to 2 although it could be adequately set to ×1.5, is resolved, and it is possible to reduce wasted power consumption.

Each circuit block constituting the power supply apparatus 100 of FIG. 1, with the exception of a condenser inside the charge pump circuit 10 and the transistor M1 of the voltage adjustment unit 20, may be integrated in one unit. At this time, the condenser is externally attached. Furthermore, the transistor M1 is connected to the outside of an integrated circuit as a discrete element, or is formed on another integrated circuit. In the voltage adjustment unit 20, in cases in which a large amount of heat is generated in the transistor M1 when the battery voltage Vbat is dropped and the voltage Vx is generated, by arranging the transistor M1 outside the integrated circuit, it is possible to distribute the heat, and to stably operate the circuit.

Furthermore, in cases in which the heat generation in the transistor M1 is not much of a problem, it may be integrated in one semiconductor chip together with another circuit block. By integrating the transistor M1 in one unit, with the D/A converter 42, the output voltage setting unit 40, and the like, since it is no longer necessary to lead wiring around the outside, it is possible to reduce the number of terminals and lessen circuit area.

Second Embodiment

A power supply apparatus according to a second embodiment boosts battery voltage Vbat, and drives a light emitting diode of three colors RGB. The three color light emitting diode is alternately lit by carrying out time division. Since an optimal voltage for driving the light emitting diode differs for each respective RGB color, the power supply apparatus changes an output voltage set value each time a light emitting diode, that is lit, is switched, and a boost ratio of a charge pump circuit is set to an optimal value.

Figure 3:
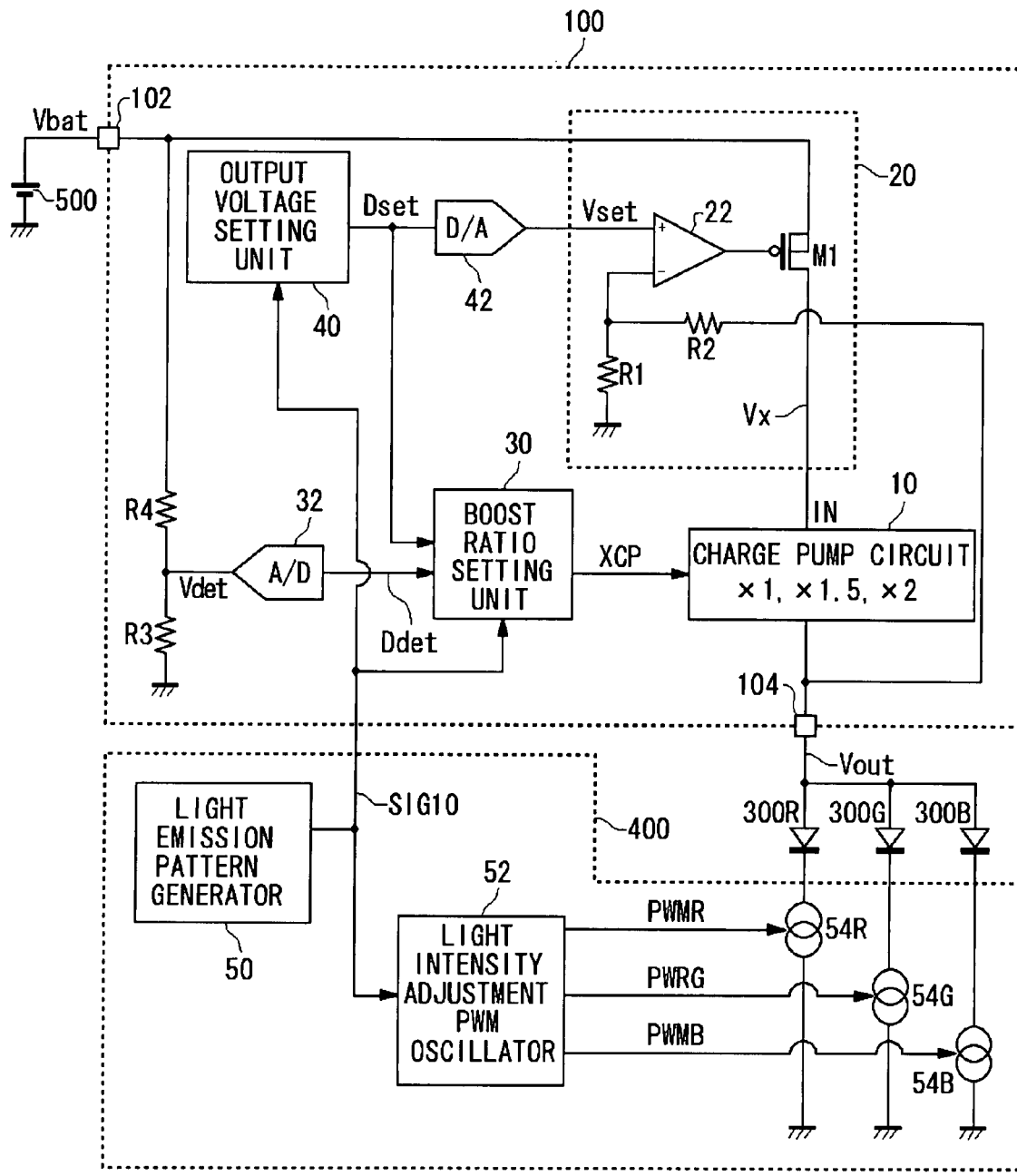
FIG. 3 is a circuit diagram showing a configuration of a light emitting device according to a second embodiment.

FIG. 3 is a circuit diagram showing a configuration of a light emitting device according to the present embodiment. In FIG. 3, component elements that are the same as, or equivalent to, those in FIG. 1 are given the same reference symbols, and explanations are omitted as appropriate. The light emitting device 1000 includes a battery 500, a power supply apparatus 100, light emitting diodes 300R to 300B that have three colors RGB, and a drive controller 400 which controls driving states of the light emitting diodes 300R to 300B. Below, where there is no particular necessity, attached letters R, G, and B, corresponding to the three colors RGB, are omitted.

The drive controller 400 is arranged on a driving path of the light emitting diodes 300, which are load circuits, and the current flowing in the light emitting diodes 300 is pulse-modulated and adjusted. The drive controller 400 includes a light emission pattern generator 50, a light intensity adjustment PWM oscillator 52, and constant current circuits 54R to 54B.

The constant current circuits 54R to 54B, by respectively controlling current flowing in the light emitting diodes 300R to 300B, adjust light emission intensity. The constant current circuits 54R to 54B generate constant current of a current value specified by the light intensity adjustment PWM oscillator 52. The constant current generated by the constant current circuits 54 is pulse-width modulated, and light intensity is adjusted according to a duty ratio thereof. That is, the constant current circuits 54 adjust the current flowing in the light emitting diodes 300 by both the current value and the duty ratio, to control the light emission intensity.

The light emission pattern generator 50 generates a light emission control signal SIG10 which selects which of the light emitting diodes 300R to 300B to make emit light, based on data stored in ROM, or data inputted from outside. In the present embodiment, each of the light emitting diodes 300R to 300B, in a time division manner, lights up, in an order of R, G, and B, with a cycle of 60 Hz, for example, performs color mixing, and generates a desired color.

The light intensity adjustment PWM oscillator 52 controls the current value generated by the constant current circuits 54R to 54B. The light emission control signal SIG10 outputted from the light emission pattern generator 50 is inputted to the light intensity adjustment PWM oscillator 52, and when light emission of a red color is specified, a PWM signal PWMR is generated. In the same way, when light emission of a blue color is specified, PWM signals PWMG and PWMB are respectively generated.

Forward voltage Vf of the light emitting diodes 300 differs for every color. Consequently, in the light emitting device 1000 in the present embodiment, output voltage Vout is set high for light emitting diode 300B in which the Vf is large, and output voltage Vout is set low for light emitting diode 300R in which the Vf is small.

The output voltage setting unit 40 generates a different digital value Dset for every color. For example, for a set value of the output voltage Vout for each color, data stored in the ROM may be used, or data inputted from outside may be stored in advance in a register. The output voltage setting unit 40 outputs, to a D/A converter 42, the set value Dset corresponding to a color specified by the light emission pattern generator 50.

The light emission control signal SIG10 outputted from the light emission pattern generator 50 is also outputted to the boost ratio setting unit 30. The boost ratio setting unit 30 re-sets the boost ratio according to a flow chart shown in FIG. 2, every time a color specified by the light emission control signal SIG10 changes.

According to the power supply apparatus 100 according to the present embodiment, every time the plural light emitting diodes 300, time-divided to be driven, are switched, since the output voltage Vout is changed to an optimal value, it is possible to drive the light emitting diodes 300 at high efficiency. As in the present embodiment, in cases in which an output voltage set value Vout' changes every time the light emitting diodes 300 are switched, in setting the boost ratio based on the output voltage Vout, time is required in setting the boost ratio; however, since the battery voltage Vbat is a stabilized value irrespective of switching of the light emitting diodes 300, in cases in which the output voltage Vout is made to fluctuate in terms of time, it is possible to set the boost ratio to an optimum value in a short time.

In addition, at light emission switching of each of the light emitting diodes 300, a non-light-emission period is provided, in which none of the light emitting diodes 300 emit light, and in this non-light-emission period, boost ratio operation of the charge pump circuit 10 may be halted. In such cases, since it is possible to reduce unnecessary switching operations, it is possible to reduce power consumption. According to the power supply apparatus 100 of the present embodiment, since the battery voltage Vbat is monitored and the boost ratio set, it is possible to set the boost ratio even when a switching operation of the charge pump circuit 10 is halted.

The abovementioned embodiments are examples; various modified examples in combinations of various component elements and various processes thereof are possible, and a person skilled in the art will understand that such modified examples are within the scope of the present invention.

For example, in the power supply apparatus 100 of FIG. 1, the boost ratio setting unit 30, the A/D converter 32, the output voltage setting unit 40, and the D/A converter 42 may be omitted, and the boost ratio may be set according to a result of comparing a set voltage from outside and a detection voltage Vdet in an analogical manner.

In the present embodiment, a transistor M1, that is used, is an FET, but other types of transistors, such as a bipolar transistor or the like, may be used, and selection thereof may be decided according to a design specification required by the power supply apparatus, by semiconductor manufacturing process used, or the like.

In the present embodiment, all of the elements of which the power supply apparatus is configured may be integrated in one unit, or a portion thereof may be configured as a discrete component. Decisions as to which part is integrated may be taken based on the semiconductor manufacturing process used, cost, space occupied, and the like.

The load circuit driven by the power supply apparatus explained in the embodiments is not limited to the light emitting diode; another light emitting element may be used, and in addition, various types of load circuit may be driven.

Third Embodiment

Premise Regarding Third Embodiment

In small sized electronic devices, such as mobile telephones, PDAs (Personal Digital Assistants), digital cameras, and the like, in order to monitor and control, by microprocessor, temperature inside the device, voltage of a battery, or the like, an A/D converter is used which converts an analog signal thereof to a digital signal.

In cases in which a plurality of analog signals are processed, there is problem with regard to cost in preparing the A/D converter for the number of signals thereof. Furthermore, particularly in cases of small sized electronic devices, there is a problem in circuit size becoming large. Accordingly, conventionally, in cases in which A/D conversion is performed on the plurality of analog signals, there is a method in which a multiplexor is used to switch the plurality of analog signals in a time division manner, and convert into digital signals, sequentially by one A/D converter (for example, Japanese Patent Application, Laid Open No. 2004-201354).

Problems of Third Embodiment

In general, 1 LSB (Least Significant Bit), which is a minimum conversion unit of an n-bit A/D converter, is expressed as $1\ LSB=FSR/2^n$. A FSR (Full Scale Range) is a convertible voltage range of an A/D converter. An A/D converter in which 1 LSB is small has good conversion accuracy. Consequently, for A/D converters of the same number of bits, the smaller the FSR is, the smaller 1 LSB becomes, and a conversion result becomes finer. On the other hand, with FSR, to prevent overrange of input, it is necessary to set a range including all voltage fluctuation ranges of analog input signals.

Consequently, in cases in which a plurality of analog signals is switched using the multiplexor and processed with one A/D converter, the FSR is set so that all the voltage fluctuation ranges of the plurality of analog signals are fitted into a voltage range FSR in which conversion by the A/D converter is possible. That is, the FSR is set to fit an analog signal with the largest voltage fluctuation, and A/D conversion is performed. However, if the FSR is set to fit the analog signal with the largest voltage fluctuation, 1 LSB becomes too large for an analog signal with small voltage fluctuations, and it has not been possible to adequately express the fluctuation state of the voltage.

The third embodiment has been made in view of these circumstances, and a general purpose thereof is to provide an A/D converter which can improve accuracy of A/D conversion even for cases in which the voltage fluctuation ranges of the analog signals differ, and also to provide an electronic device and a power supply apparatus using the A/D converter.

Below, an explanation is given concerning the third embodiment.

Figure 4:
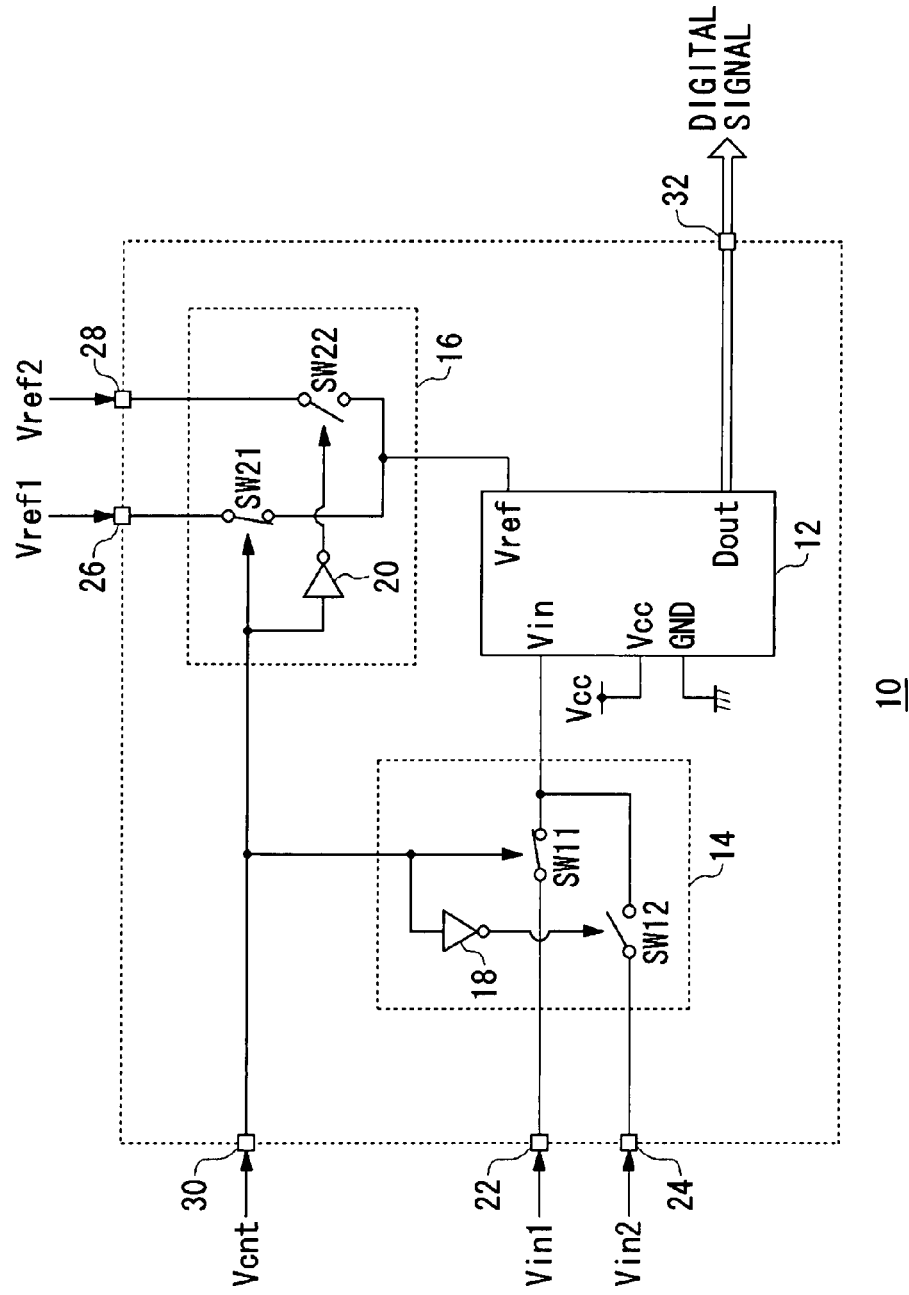
FIG. 4 is a circuit diagram showing a configuration of an A/D converter according to a third embodiment.

FIG. 4 is a circuit diagram showing a configuration of the A/D converter 10 according to a third embodiment. The A/D converter 10 switches, in a time division manner, an analog signal Vin1 inputted to an input terminal 22, and an analog signal Vin2 inputted to an input terminal 24, converts to a digital value, and outputs from an output terminal 32. The A/D converter 10 is provided with an A/D conversion unit 12, a first selector 14, and a second selector 16.

The first selector 14 performs selection of the analog signal Vin1 inputted to the input terminal 22 of the A/D converter 10, and the analog signal Vin2 inputted to the input terminal 24. The first selector 14 is provided with a switch SW11, a switch SW12, and an inverter 18. One end of the switch SW11 and one end of the switch SW12 are respectively connected to the input terminal 22 and the input terminal 24 of the A/D converter 10. The other end of the switch SW11 and the other end of the switch SW12 are connected to each other, and are connected to an input terminal Vin of the A/D conversion unit 12. The switch SW11 and the switch SW12 can be composed, for example, of an analog switch that uses a MOSFET, or the like.

The switch SW11 and the switch SW12 can be switched to ON and OFF states by a control signal Vcnt inputted to an input terminal 30 of the A/D converter 10 from outside. The control signal Vcnt is a signal that takes two values, a high level or a low level value. Since the control signal Vcnt, which is inputted to the switch SW12, is inputted via the inverter 18, a value, which is always an inverse of a value of the control signal Vcnt inputted to the switch SW11, is inputted. That is, the switch SW11 and the switch SW12 are always in ON and OFF inverse states, and one of the analog signals Vin1 or Vin2 is selected, and is inputted to the input terminal Vin of the A/D conversion unit 12.

The second selector 16 performs selection of a first reference voltage Vref1 inputted to an input terminal 26, and a second reference voltage Vref2 inputted to an input terminal 28. This second selector 16 is provided with a switch SW21, a switch SW22, and an inverter 20. One end of the switch SW21 and one end of the switch SW22 are respectively connected to the input terminal 26 and the input terminal 28 of the A/D converter 10. The other end of the switch SW21 and the other end of the switch SW22 are connected to each other, and are connected to a reference voltage terminal Vref of the A/D conversion unit 12. The switch SW21 and the switch SW22 can be composed of an analog switch that uses a MOSFET, or the like.

The switch SW21 and the switch SW22 can also be switched to ON and OFF states by a control signal Vcnt. Since the control signal Vcnt, which is inputted to the switch SW22, is inputted via the inverter 20, a value, which is always an inverse of a value of the control signal Vcnt inputted to the switch SW21, is inputted. That is, the switch SW21 and the switch SW22 are always in ON and OFF inverse states, and one of the first reference voltage Vref1 or the second reference voltage Vref2 is selected, and is inputted to the reference voltage terminal Vref of the A/D conversion unit 12.

Since signal lines of the control signal Vcnt inputted to the first selector 14 and the second selector 16 are connected, selection switching of the first selector 14 and the second selector 16 is performed synchronously. That is, when the switch SW11 of the first selector 14 is put in an ON state by the control signal Vcnt, the switch SW21 of the second selector 16 goes into an ON state, the analog signal Vin1 is inputted to the input terminal Vin of the A/D conversion unit 12, and the first reference voltage Vref1 is inputted to the reference voltage terminal Vref. When the switch SW12 of the first selector 14 is put in an ON state by the control signal Vcnt, the switch SW22 of the second selector 16 goes into an ON state, the analog signal Vin2 is inputted to the input terminal Vin of the A/D conversion unit 12, and the second reference voltage Vref2 is inputted to the reference voltage terminal Vref.

The A/D conversion unit 12 is provided with the input terminal Vin, the reference voltage terminal Vref, a power supply terminal Vcc, a ground terminal GND, and an output terminal Dout. The power supply terminal Vcc is connected to a constant voltage supply that has a voltage value of Vcc, and the ground terminal GND is grounded. The A/D conversion unit 12 converts the analog signal Vin1 or the analog signal Vin2 selected by the first selector 14 into a digital signal based on the first reference voltage Vref1 or the second reference voltage Vref2 selected by the second selector 16, and outputs from the output terminal Dout. The output terminal Dout is connected to the output terminal 32 of the A/D converter 10.

A convertible voltage range FSR of the A/D conversion unit 12 is from 0 V to a voltage value inputted to the reference voltage terminal Vref. That is, in cases in which the first reference voltage Vref1 is selected by the second selector 16, the analog signal Vin1 inputted to the input terminal Vin of the A/D conversion unit 12 undergoes A/D conversion with 0 to Vref1 (V) as the FSR. On the other hand, in cases in which the second reference voltage Vref2 is selected by the second selector 16, the analog signal Vin2 inputted to the input terminal Vin of the A/D conversion unit 12 undergoes A/D conversion with 0 to Vref2 (V) as the FSR. Accordingly, 1 LSB of the analog signal Vin1 is Vref1/$2^n$, and 1 LSB of the analog signal Vin2 is Vref2/$2^n$.

Selection switching of the first selector 14 and the second selector 16 is controlled, in a time division manner, by the control signal Vcnt inputted to the input terminal 30, and the analog signal Vin1 or Vin2 is sequentially converted to a digital signal, and outputted from the output terminal 32.

By the second selector 16 being provided, the A/D converter 10 according to the present embodiment can switch the reference voltage of the A/D conversion unit 12, synchronizing with selection switching of the analog signal by the first selector 14. Since it is possible to set separate reference voltages for the two analog input signals, it is possible to perform A/D conversion using a reference voltage appropriate to a voltage fluctuation range of each of the analog signals.

For example, in cases in which the voltage fluctuation range of the analog signal Vin1 is in a range of 0 V to 5 V, the first reference voltage Vref1 may be set to 5 V, and in cases in which the voltage fluctuation range of the analog signal Vin2 is in a range of 0 V to 1 V, the second reference voltage Vref2 may be set to 1 V. In such cases, if the number of bits of the A/D conversion unit 12 is taken as 8 bits, the 1 LSB of the analog signal Vin1 becomes 1 LSB=$5/2^8 \approx 20$ mV, and the 1 LSB of the analog signal Vin2 becomes 1 LSB=$1/2^8 \approx 4$ mV. That is, conversion accuracy of the analog signal Vin2 improves five times compared to cases in which A/D conversion is performed with an FSR of 0 V to 5 V fitting the analog signal Vin1. In consideration of the error of an ON resistance of an analog switch, the first reference voltage Vref1 and the second reference voltage Vref2 may be set to have some margin.

There is no particular limitation to conversion method of the A/D conversion unit 12, and as long as the method performs the A/D conversion based on the reference voltage, any of successive approximation, double integration, and parallel comparison methods may be used. Since conversion speed differs according to conversion method, it is desirable to make a selection fitting a characteristic of a device applying the A/D converter 10.

In the present embodiment, an explanation has been given concerning cases in which there are two analog signals inputted to the A/D converter 10, but, clearly, the present invention can also be applied to cases in which a plurality of signals are inputted. In such cases, an equal number of reference voltages as the analog signals may be prepared, and in cases in which there are analog signals of the same voltage fluctuation range, one reference voltage may be used jointly.

Furthermore, for one input voltage, in cases of measuring the battery voltage, for example, the reference voltage may be made small when the voltage is stable, and the reference voltage may be made large when the battery voltage has begun to decay; the reference voltage may be made small when measuring voltage before boosting, and the reference may be made large when measuring the battery voltage after boosting.

Figure 5:
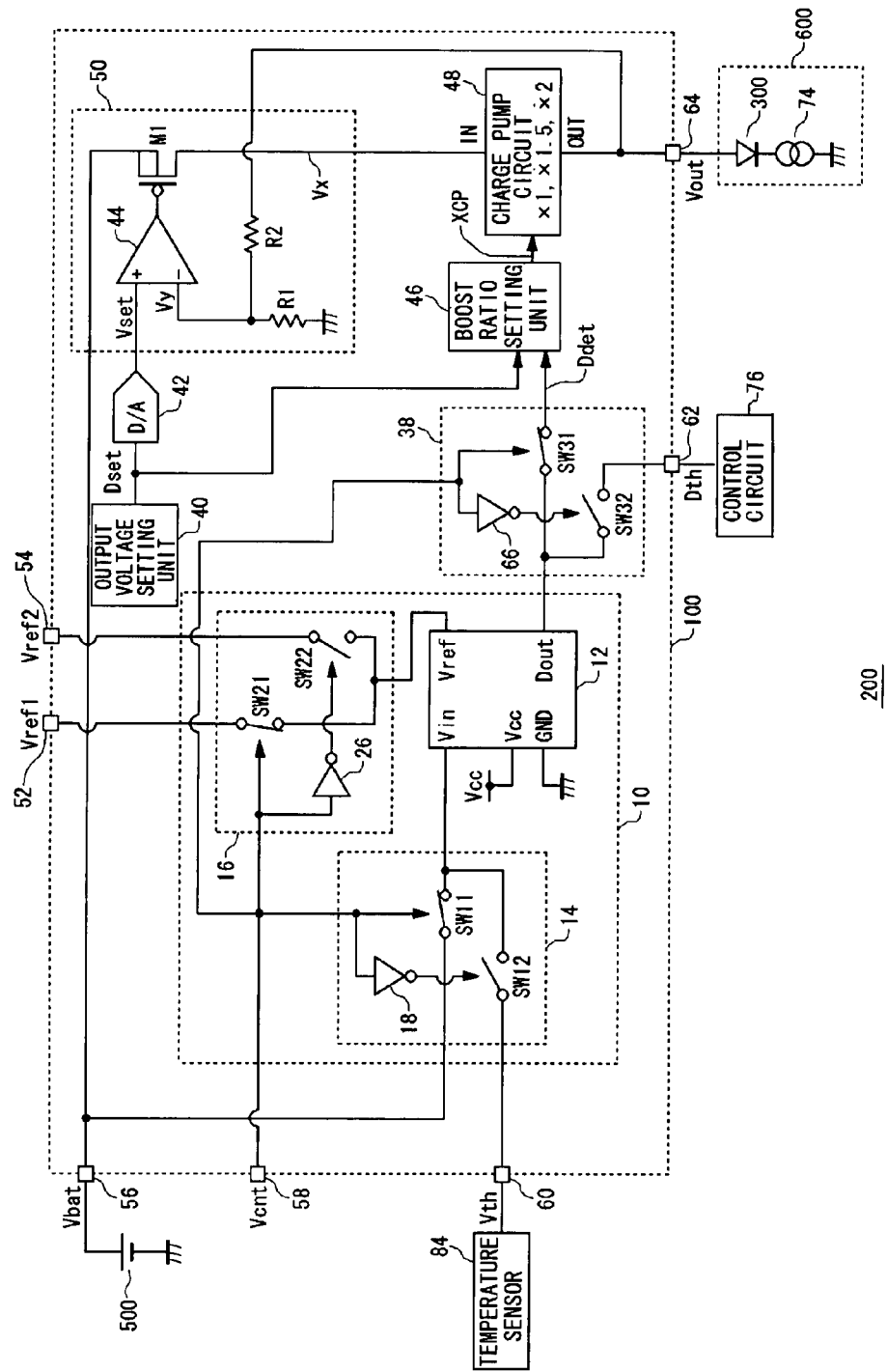
FIG. 5 is a circuit diagram showing a configuration of an electronic device and a power supply apparatus using the A/D converter according to the third embodiment.

Various devices can be configured using the A/D converter 10 according to the present embodiment. FIG. 5 is a circuit diagram showing a configuration of an electronic device 200 and a power supply apparatus 100 using the A/D converter 10 according to the present embodiment. The electronic device 200 is a light emitting device. The electronic device 200 is provided with a battery 500, a light emitting circuit 600 including a light emitting diode 300 and a constant current circuit 74, a temperature sensor 84, a control circuit 76 which performs control using information from the temperature sensor 84, and a power supply apparatus 100.

The power supply apparatus 100, with a battery voltage Vbat outputted from the battery 500 as an input signal, boosts the battery voltage Vbat, and generates voltage necessary for driving the light emitting circuit 600 that is a load circuit. Furthermore, the power supply apparatus 100, with a temperature sensor voltage Vth outputted from the temperature sensor 84 as an input signal, performs conversion to a digital signal, and outputs to the control circuit 76.

The battery voltage Vbat outputted from the battery 500 is inputted to an input terminal 56 of the power supply apparatus 100. The battery voltage Vbat is assumed to be an analog signal in which voltage fluctuates in a range of 4.5 V to 5 V. The light emitting circuit 600 is connected to the output terminal 64. An anode of the light emitting diode 300 is connected to an output terminal 64, and a cathode is connected to the constant current circuit 74. The power supply apparatus 100 boosts the battery voltage Vbat inputted to the input terminal 56, and outputs the output voltage Vout from the output terminal 64.

Furthermore, the temperature sensor voltage Vth, from the temperature sensor 84 composed of a thermistor or the like, is inputted to an input terminal 60 of the power supply apparatus 100. The temperature sensor voltage Vth is an analog signal that fluctuates in a range of 0 V to 1 V. The power supply apparatus 100 performs A/D conversion to convert the temperature sensor voltage Vth inputted to the input terminal 60, to a digital signal Dth, and outputs from the output terminal 62. The control circuit 76, which uses the temperature sensor voltage Vth as temperature information, is connected to the output terminal 62. The control circuit 76 may be, for example, a drive circuit of a peltiert device which cools an LSI.

The power supply apparatus 100 is provided with an A/D converter 10, a charge pump circuit 48, a voltage adjustment unit 50, a boost ratio setting unit 46, an output voltage setting unit 40, a D/A converter 42, and a third selector 38.

The charge pump circuit 48 switches a plurality of boost ratios, by changing a number of stages of the charge pump circuit, is configured so that the outputted voltage can be changed, boosts voltage Vx, to be inputted to an input terminal IN, by a specified boost ratio, and outputs from an output terminal OUT thereof. The output terminal OUT of the charge pump circuit 48 forms, as it is, the output terminal 64 of the power supply apparatus 100. In the present embodiment, the boost ratio of the charge pump circuit 48 can be can be switched between any of ×1, ×1.5, and ×2.

The output voltage Vout=Vx×XCP is outputted from the output terminal 64 of the power supply apparatus 100, that is, the output terminal OUT of the charge pump circuit 48, with the boost ratio thereof being XCP.

The output voltage setting unit 40 generates the output voltage Vout, to be supplied by the power supply apparatus 100 to the light emitting circuit 600, as a digital value Dset, based on data stored in ROM (Read Only Memory) or data inputted from outside. The D/A converter 42 performs D/A conversion of the digital signal Dset outputted from the output voltage setting unit 40, and outputs a set voltage Vset that is an analog signal to the voltage adjustment unit 50. Furthermore, the digital value Dset generated by the output voltage setting unit 40 is inputted to the boost ratio setting unit 46.

The voltage adjustment unit 50, which is a regulator circuit, drops the battery voltage Vbat inputted to the input terminal 56, as necessary, and outputs to the input terminal IN of the charge pump circuit 48. The voltage adjustment unit 50 includes a transistor M1, an operational amplifier 44, and resistors R1 and R2.

Voltage according to the set voltage Vset outputted from the output voltage setting unit 40, is inputted to a non-inverting input terminal of the operational amplifier 44, and output voltage Vout is divided by the resistors R1 and R2 and inputted to an inverting input terminal.

The transistor M1 is a MOSFET, and is arranged between the input terminal 56 of the power supply apparatus 100 and the input terminal IN of the charge pump circuit 48. An output terminal of the operational amplifier 44 is connected to a gate terminal, which is a control terminal of the transistor M1. The voltage adjustment unit 50 adjusts an ON resistance by voltage inputted to the gate terminal of the transistor M1, and adjusts voltage of a drain terminal, that is, voltage Vx of the input terminal IN of the charge pump circuit 48.

In the voltage adjustment unit 50, the operational amplifier 44 adjusts the voltage of the gate terminal of the transistor M1 so that two voltages inputted to the inverting input terminal and the non-inverting input terminal become equal. Here, the set voltage Vset is inputted to a non-inverting input terminal of the operational amplifier 44, and voltage Vy=Vout×R1/(R1+R2) is inputted to the inverting input terminal. When feedback by the operational amplifier 44 makes Vset=Vy, and the ON resistance of the transistor M1 is adjusted, the output voltage is stabilized so that Vout=Vset×(R1+R2)/R1. At this time, the voltage Vx of the input terminal IN of the charge pump circuit 48 is stabilized to approach Vx=Vout/XCP=Vset×(R1+R2)/R1/XCP.

Different analog signals of two voltage fluctuation ranges of the temperature sensor voltage Vth and the battery voltage Vbat are inputted to the A/D converter 10. As described above, the A/D converter 10 selects one of the battery voltage Vbat or the temperature sensor voltage Vth by the first selector 14, converts to a digital value by the A/D conversion unit 12, and outputs to the third selector 38. Selection of the battery voltage Vbat and the temperature sensor voltage Vth can be switched by a control signal Vcnt inputted to the input terminal 58. Selection switching of the first reference voltage Vref1 and the second reference voltage Vref2 is performed in synchronization with selection switching of the battery voltage Vbat and the temperature sensor voltage Vth, and sequential A/D conversion is carried out.

The first reference voltage Vref1 inputted to the input terminal 52 is set as 5 V to fit the voltage fluctuation range of the battery voltage Vbat. The second reference voltage Vref2 inputted to the input terminal 54 is set to 1 V to fit the voltage fluctuation ranger of the temperature sensor voltage Vth.

The third selector 38 is provided with a switch SW31, a switch SW32, and an inverter 66. The switch SW31 and the switch Sw32 can be configured using, for example, a MOS-FET, or the like. One end of the switch SW31 is connected to the boost ratio setting unit 46. One end of the switch SW32 is connected to the output terminal 62. The other end of the switch SW31 and the other end of the switch SW32 are connected to each other, and are connected to an output terminal Dout of the A/D conversion unit 12.

For the third selector 38 also, ON-OFF states of the switch SW31 and the switch SW32 are switched, in synchronization with the first selector 14 and the second selector 16, by the control signal Vcnt. In cases in which the battery voltage Vbat undergoes A/D conversion, the switch SW31 goes into an ON state, and the digital value Ddet expressing the battery voltage Vbat is outputted to the boost ratio setting unit 46.

Furthermore, in cases in which selection is switched by the control signal Vcnt, and the temperature sensor voltage Vth undergoes A/D conversion, the switch SW32 goes into an ON state, and the digital signal Dth expressing the temperature sensor voltage Vth is outputted from the output terminal 62. The digital signal Dth expressing the temperature sensor voltage Vth in inputted to the control circuit 76 that is connected to the output terminal 62, and is used as temperature information.

The digital value Ddet expressing the battery voltage Vbat, and Dset specifying a set value of the output voltage Vout are inputted to the boost ratio setting unit 46. That is, by comparing two digital signals Dset and Ddet, the boost ratio setting unit 46 compares a set value of the output voltage Vout (below referred to as output voltage set value Vout') and the battery voltage Vbat, and sets the boost ratio XCP of the charge pump circuit 48 based on a comparison result thereof.

The boost ratio setting unit 46 sets the boost ratio XCP by, for example, the following type of processing. The boost ratio setting unit 46, by comparing the digital signals Dset and Ddet, compares the output voltage set value Vout' and the battery voltage Vbat. When a result thereof is Vbat>Vout', the boost ratio XCP is set to ×1. Furthermore, when Vout'<3⁄2× Vbat, the boost ratio XCP is set to ×1.5. Moreover, when Vout'<2×Vbat, the boost ratio XCP is set to ×2. The boost ratio setting unit 46 specifies the boost ratio XCP set in this way to the charge pump circuit 48.

Figure 6:
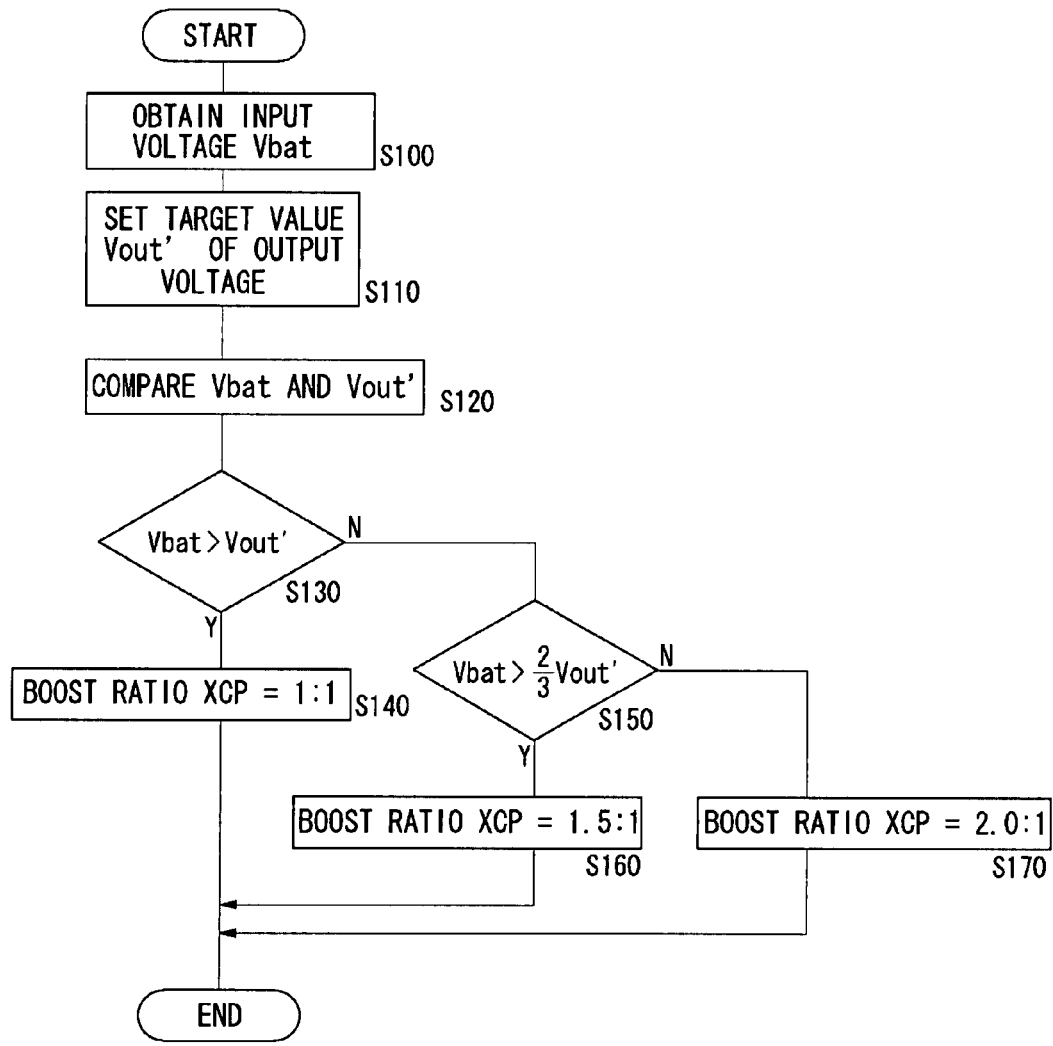
FIG. 6 is a flow chart showing a setting procedure of a boost ratio XCP of a boost ratio setting unit in the power supply apparatus.

FIG. 6 is a flow chart showing a setting procedure for the boost ratio XCP of the boost ratio setting unit 46 in the power supply apparatus 100. First, the battery voltage Vbat undergoes A/D conversion by the A/D converter 10, and a voltage value thereof is obtained as the digital signal Ddet (S100).

Next, in the output voltage setting unit 40, the output voltage set value Vout', which is the set value of the output voltage Vout, is generated, and outputted as the digital value Dset (S110). Order of processing shown in S100 and S110 may be reversed.

The boost ratio setting unit 46 starts comparison processing of the battery voltage Vbat and the output voltage set value Vout' based on the set digital values Ddet and Dset, obtained in S100 and S110 (S120).

When Vbat>Vout' (Y in S130), the boost ratio XCP is set to ×1 (S140). When Vbat<Vout' (N in S130), the battery voltage Vbat and a voltage ⅔×Vout' are compared, and when Vbat>⅔×Vout' (Y in S150), the boost ratio XCP is set to ×1.5 (S160). When Vbat<⅔×Vout' (N in S150), the boost ratio XCP is set to ×2.

For example, the battery voltage Vbat is 3.6 V, and the output voltage set value Vout' is 4.7 V. At this time, since 3.6 V>⅔×4.7 V holds, by the abovementioned procedure in the boost ratio setting unit 46, the boost ratio XCP is set to be ×1.5.

When the boost ratio of the charge pump circuit 48 is set to ×1.5 and the boosting operation is started, the input voltage Vx of the charge pump circuit 48 is controlled to be fed back, by the voltage adjustment unit 50, so that Vx=4.7/1.5=3.13 V, and is stabilized. As a result, the output voltage Vout of the power supply apparatus 100 is stabilized at 4.7 V, which is the output voltage set value Vout'. By the output voltage Vout being stabilized, it is possible to stabilize the light emitting diode 300, to emit light.

Selection switching of the first selector 14, the second selector 16, and the third selector 38 by the control signal Vcnt inputted to the input terminal 58, is performed in a time division manner. Timing of the selection switching is controlled by a CPU (Central Processing Unit), not shown in the figures, connected to the input terminal 58.

In this way, the power supply apparatus 100 can appropriately set the boost ratio based on the battery voltage Vbat outputted from the battery 500, and output voltage adjusted to a predetermined target value can be outputted to the light emitting circuit 600. Furthermore, the temperature sensor voltage Vth, which is an analog signal outside of the boosted and adjusted battery voltage Vbat, can be A/D converted and outputted. Even in cases in which a voltage fluctuation range of the battery voltage Vbat and a voltage fluctuation range of the temperature sensor voltage Vth are different, since separate respective reference voltages can be selected, even in cases in which the same A/D conversion unit 12 is used, it is possible to improve conversion accuracy.

Generally, with regard to an analog signal outputted from a sensor, such as a temperature sensor or the like, in many cases voltage fluctuation range are small in comparison to power supply, so that it has been necessary to separately provide an A/D converter for the sensor in order to perform A/D conversion with good accuracy. However, by using the A/D converter 10 according to the present embodiment, even in cases in which voltage fluctuation ranges of a plurality of analog signals differ, since it is possible to perform A/D conversion with high resolution, it is possible to reduce the cost of the electronic device. Furthermore, since circuit size becomes small, this is effective in miniaturizing the electronic device.

The abovementioned embodiment is an example; various modified examples in combinations of various component elements and various processes thereof are possible, and a person skilled in the art will understand that such modified examples are within the scope of the present invention.

In the present embodiment, all of the elements of which the A/D converter or the power supply apparatus are configured may be integrated in one unit, or a portion thereof may be configured as a discrete component. Moreover, the integration may include the constant current circuit 74. Decisions as to which part is integrated may be taken based on the semiconductor manufacturing process used, cost, space occupied, and the like.

A device that applies the A/D converter explained in the embodiment is not limited to the power supply apparatus, and as long as the apparatus is for processing a plurality of analog signals, application can be made irrespective of type. Furthermore, the load circuit which is driven by the power supply apparatus is not limited to the light emitting circuit using the light emitting diode, and other light emitting elements, such as organic EL elements may be used, and in addition, various types of load circuit may be driven. Moreover, the sensor is not limited to the temperature sensor, and a magnetic sensor, a pressure sensor, an optical sensor, or the like, may be used.

Fourth Embodiment

A fourth embodiment, similar to the first and the second embodiments, appropriately sets a boost ratio of a charge pump circuit. That is, in the power supply apparatus described in Patent Document 1, for example, in cases in which the battery voltage is 3.5 V, and voltage (below, referred to as target voltage) to be supplied to a load, such as an LED or the like, is 7.0 V, the boost ratio of the charge pump circuit is set at ×2. However, there are cases in which a voltage drop occurs due to a resistance component of an internal circuit or the like, of the power supply apparatus, and the voltage supplied to the load ends up being lower than the target voltage. Furthermore, if the boost ratio of the charge pump circuit is set high, in advance, the higher the boost ratio, the larger the consumed power of the charge pump circuit; and in addition, since a voltage drop value changes with consumed current, in cases in which the boost ratio is set higher than necessary, power usage efficiency of the power supply apparatus decreases.

In other words, in the power supply apparatus described in Patent Document 1, the boost ratio could not be appropriately set in accordance with fluctuation of the input voltage and size of the output current. The fourth embodiment, which is explained below, relates to technology for appropriately setting the boost ratio.

Configuration and Basic Operation

Figures 7, 8:
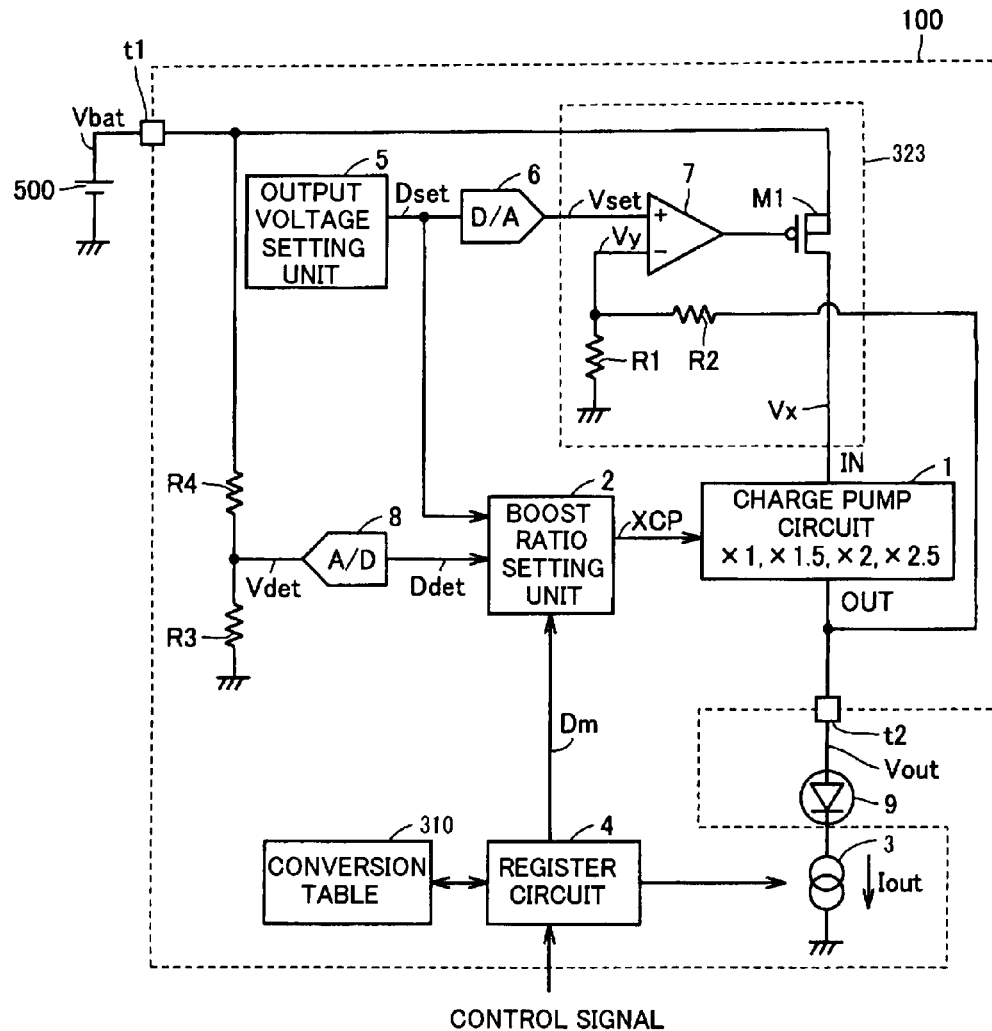
FIG. 7 is a circuit diagram showing a configuration of a power supply apparatus according to a fourth embodiment.
FIG. 8 shows an example of a conversion table using a register circuit.

FIG. 7 is a diagram showing a configuration of a power supply apparatus 100 according to an embodiment of the present invention. Referring to the same figure, a battery voltage Vbat of a battery 500 is applied as an input voltage to an input terminal t1 of the power supply apparatus 100. A load 9, which is, for example, an LED, is connected to an output terminal t2 of the power supply apparatus 100. The power supply apparatus 100 boosts the battery voltage Vbat applied to the input terminal t1, outputs the boosted voltage as an output voltage Vout from the output terminal t2, to supply the load 9.

The power supply apparatus 100 is provided with a charge pump circuit 1, a boost ratio setting unit 2, a register circuit 4, an output voltage setting unit 5, a D/A (Digital/Analog) converter 6, an A/D (Analog/Digital) converter 8, resistors R3 to R4, a constant current circuit 3, a conversion table 310, and a voltage adjustment unit 323.

The voltage adjustment unit 323 includes an operational amplifier 7, resistors R1 and R2, and a P-type MOS transistor M1. Below, an explanation is given with resistance values of the resistors R1 to R4 as r1 to r4.

The output voltage setting unit 5 generates a digital value Dset expressing a voltage (target voltage) to be supplied to the load 9, based on data stored in ROM (Read Only Memory) and data inputted from outside, and outputs to the D/A converter 6 and the boost ratio setting unit 2.

The D/A converter 6 performs digital-analog conversion of the digital value Dset received from the output voltage setting unit 5, to be output as an analog voltage Vset to the operational amplifier 7 of the voltage adjustment unit 323.

The voltage adjustment unit 323, which is a regulator circuit, drops and adjusts the battery voltage Vbat, based on the target voltage that the analog voltage Vset, received from the D/A converter 6, expresses, and on a divided value of the output voltage Vout, and outputs, as a voltage Vx, to the charge pump circuit 1.

More specifically, the operational amplifier 7 applies a voltage to a gate terminal of the MOS transistor M1 so that two voltages applied to a non-inverting input terminal and an inverting input terminal become equal, and adjusts an ON resistance of the MOS transistor M1. Here, the analog voltage Vset received from the D/A converter 6 is applied to the non-inverting input terminal of the operational amplifier 7, and also, a voltage Vy, for which the output voltage Vout is divided by the resistor R1 and the resistor R2, is applied to the inverting input terminal. The voltage Vy=Vout×r1/(r1+r2). By configuring a feedback circuit by the operational amplifier 7, the MOS transistor M1, and the charge pump circuit 1, feeding back so that Vset=Vy, and adjusting the ON resistance of the MOS transistor M1, the output voltage Vout converges so as to satisfy Vout=Vset×(r1+r2)/r1. At this time, the voltage Vx applied to the input terminal of the charge pump circuit 1 converges to Vx=Vout/XCP=Vset×(r1+r2)/r1/XCP.

The charge pump circuit 1 boosts the voltage Vx received from the voltage adjustment unit 323 by the boost ratio XCP set by the boost ratio setting unit 2, and outputs the boosted voltage to the output terminal t2. The charge pump circuit 1 can switch the boost ratio to, for example, ×1, ×1.5, ×2, and ×2.5. The voltage outputted to the output terminal t2 is supplied to the load 9 as the output voltage Vout. The output voltage becomes Vout=Vx×XCP.

The resistor R3 and the resistor R4 divide the battery voltage Vbat applied to the input terminal t1, and output to the A/D converter 8, as a detection voltage Vdet, so that Vdet=Vbat×r3/(r3+r4).

The A/D converter 8 performs analog-digital conversion of the detection voltage Vdet, and outputs to the boost ratio setting unit 2, as a digital value Ddet.

The register circuit 4 outputs a current value to be supplied to the load 9, to the constant current circuit 3, based on a control signal received from outside, and also receives, from the conversion table 310, a margin voltage corresponding to a current value to be supplied to the load 9, and outputs a digital value Dm (below, also referred to as margin voltage value Dm) to the boost ratio setting unit 2. In addition, the register circuit 4 is not limited to a configuration which outputs the current value to be supplied to the load 9, to the constant current circuit 3, and a configuration is possible in which a measured value of current flowing in the load 9 is simply received from outside, or the current flowing in the load 9 is directly measured, and the margin voltage corresponding to this measured value is obtained from the conversion table 310.

The constant current circuit 3 supplies current to the load 9, based on a current value received from the register circuit 4.

FIG. 8 shows an example of the conversion table 310 using a register circuit. Iout expresses a current to be supplied to the load 9.

Referring to the same figure, with regard to the register circuit 4, in cases in which the current value to be supplied to the load 9 is Iout=0 to 50 mA, based on a control signal received from outside, the margin voltage value Dm=0.2 V. In the same way, in cases in which Iout=50 to 100 mA, the margin voltage value Dm=0.4 V, in cases in which Iout=100 to 150 mA, the margin voltage value Dm=0.6 V, and in cases in which Iout=150 to 200 mA, the margin voltage value Dm=0.8 V.

Here, the margin voltage value is a value decided by a resistance component of a predetermined section on a path from the input terminal t1 to input of the load 9. A resistance component of the charge pump circuit 1 may, for example, be cited as the resistance component that is dominant on a path from the input terminal t1 to the input of the load 9. Furthermore, in cases in which the power supply apparatus according to the embodiment of the present invention is a semiconductor integrated circuit, a resistance component or the like, due to wire bonding and wiring of an external substrate or the like, is included in the resistance component on a path from the input terminal t1 to the load 9. The margin voltage value can be obtained, for example, by actually measuring the voltage applied to the load 9, and computing a difference from a theoretical value. Furthermore, a resistance value of the charge pump circuit 1 may be obtained theoretically or by experiment, and the margin voltage value based on only the resistance value of the charge pump circuit 1, may be reflected in the conversion table 310. By a configuration using this kind of conversion table, it is possible to respond flexibly to fluctuations in resistance component of each circuit due to types of device, manufacturing variations, and the like.

The boost ratio setting unit 2 sets the boost ratio XCP of the charge pump circuit 1 based on the digital value Ddet received from the A/D converter 8 expressing input voltage, the digital value Dset (below, also referred to as target voltage Dset) received from the output voltage setting unit 5 expressing target voltage, and the margin voltage value Dm received from the register circuit 4.

Operation

Next, an explanation is given concerning operation when the boost ratio setting unit 2 sets the boost ratio XCP in the power supply apparatus 100 according to the embodiment of the present invention.

Figure 9:
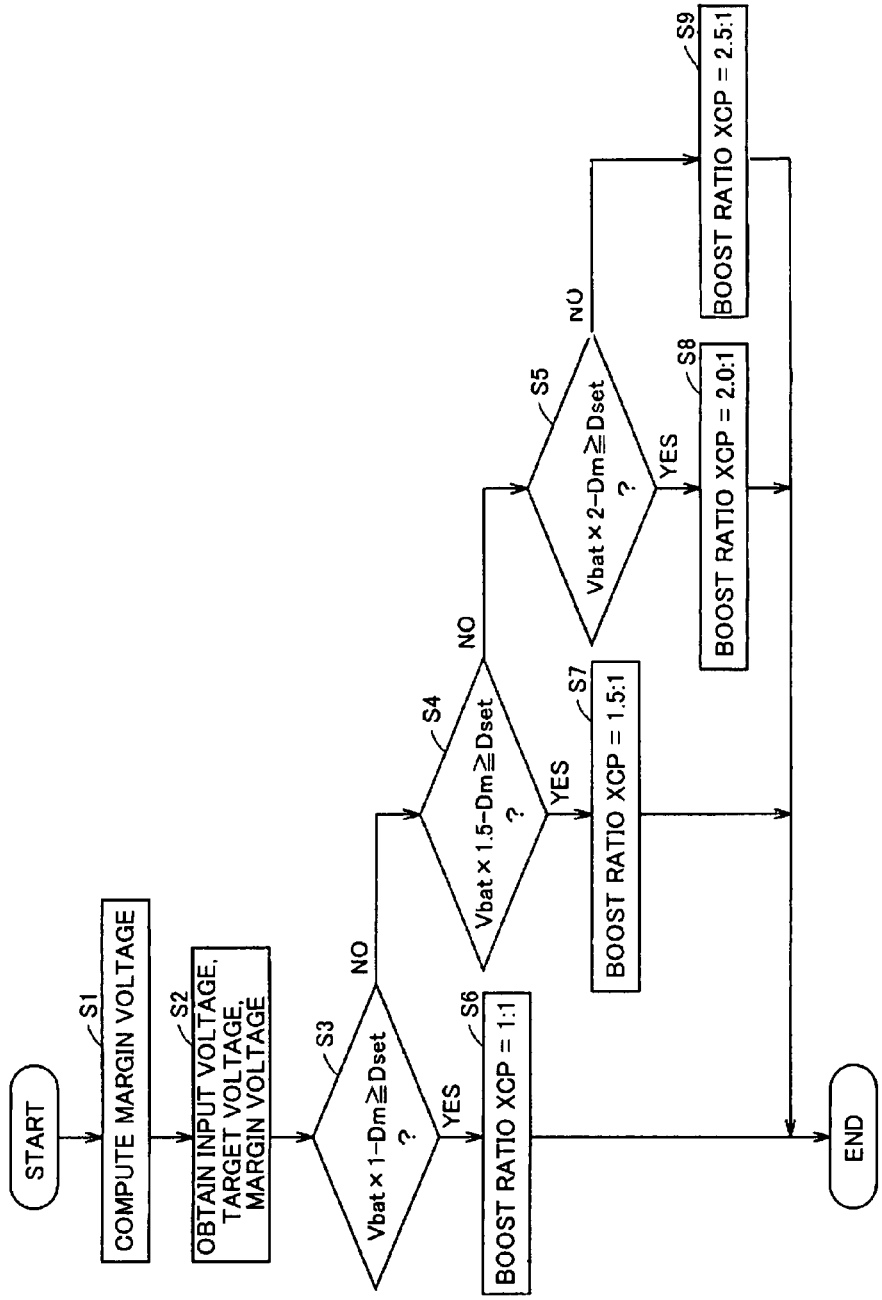
FIG. 9 is a flow chart in which an operation procedure of the power supply apparatus according to the fourth embodiment is determined.

FIG. 9 is a flow chart in which an operation procedure of the power supply apparatus 100, according to the embodiment of the present invention, is determined.

First, the register circuit 4 outputs the margin voltage value Dm corresponding to a current value to be supplied to the load 9, to the boost ratio setting unit 2 (S1).

The boost ratio setting unit 2 obtains the battery voltage Vbat, which is the input voltage, as a digital value Det, obtains the target voltage value Dset, and also obtains the margin voltage value Dm (S2).

Next, in cases in which a value obtained by subtracting the margin voltage value Dm from the battery voltage Vbat is greater than or equal to the target voltage value Dset, the boost ratio setting unit 2 sets the boost ratio XCP to ×1 (YES in S3 and S6).

Furthermore, in cases in which a value obtained by subtracting the margin voltage value Dm from the battery voltage Vbat is less than the target voltage value Dset, when a value obtained by subtracting the margin voltage value Dm from 1.5 times the battery voltage Vbat is greater than or equal to the target voltage value Dset, the boost ratio setting unit 2 sets the boost ratio XCP to ×1.5 (NO in S3, YES in S4, and S7).

In the same way, by comparing a value obtained by subtracting the margin voltage value Dm from 2 or 2.5 times the battery voltage Vbat, and the target voltage value Dset, the boost ratio setting unit 2 sets the boost ratio to ×2 or ×2.5 (S5, S8 and S9).

Below, as a specific example, an explanation is given concerning cases in which the battery voltage Vbat is 3.6 V, the target voltage value Dset is 7.0 V, the current value Iout, to be supplied to the load 9, is 80 mA, and the register circuit 4 uses the conversion table shown in FIG. 8.

On receiving the control signal from outside and recognizing that the current value Iout, to be supplied to the load, is 80 mA, the register circuit 4 refers to the conversion table 310, with the margin voltage value Dm=0.4 V, and outputs to the boost ratio setting unit 2.

By doing so, the boost ratio setting unit 2 judges, from the fact that 3.6 V×2−0.4 V<7.0 V holds (NO in S5), that the target voltage cannot be supplied to the load 9, with the boost ratio XCP being ×2.0, and sets the boost ratio XCP to ×2.5 (S9).

Here, if the boost ratio XCP is set to ×2.5, the voltage supplied to the load 9 is 3.6 V×2.5−0.4 V=8.6 V, and becomes larger than the target voltage value Dset=7.0 V. However, as described above, since the voltage adjustment unit 323 drops and adjusts the battery voltage Vbat, based on the target voltage expressed by the analog voltage Vset received from the D/A converter 6, and the divided value of the output voltage Vout, and outputs to the charge pump circuit 1 as the voltage Vx, it is possible to have the voltage supplied to the load 9 as 7.0 V, which is the target voltage value.

Mobile Information Terminal

Figure 10:
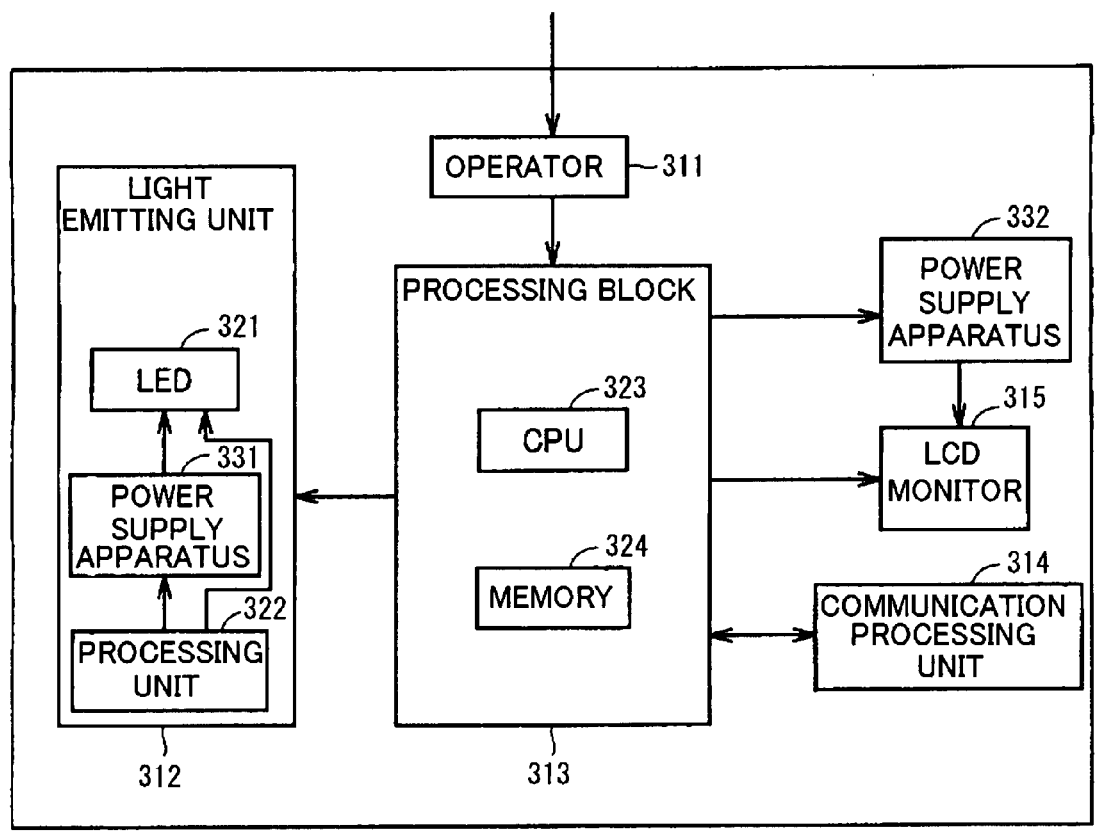
FIG. 10 is a functional block diagram of a mobile information terminal having the power supply apparatus according to the fourth embodiment.

FIG. 10 is a functional block diagram of a mobile information terminal having the power supply apparatus according to the embodiment of the present invention.

Referring to the same figure, the mobile information terminal includes power supply apparatuses 331 and 332, an operator 311, a light emitting unit 312, a processing block 313, a communication processing unit 314, and an LCD monitor 315. Furthermore, the light emitting unit 312 includes an LED 321 and a processing unit 322, and the processing block 313 includes a CPU 323 and a memory 324.

Below, an explanation is given assuming that the mobile information terminal is a mobile telephone, but the mobile information terminal may also be a PDA or the like.

The communication processing unit 314 executes processing necessary for communication. That is, the communication processing unit 314 executes processing necessary for communication in a mobile communication system such as a PDC (Personal Digital Cellular System), a personal handyphone system, CDMA (Code Division Multiple Access), IrDA (Infrared Data Association) system, or the like.

The operator 311 includes a button for a user to input a telephone number or the like, and detects the user's operation.

When there is an incoming call, the light emitting unit 312 causes the LED 321 to flash with illumination. The processing unit 322 outputs a control signal expressing a command to make the LED 321 flash, to the LED 321. In addition, the processing unit 322 outputs a control signal expressing a voltage value to be supplied to the LED 321, to the power supply apparatus 331.

The power supply apparatus 331 outputs a voltage to the LED 321 based on the voltage value expressed by the control signal received from the processing unit 322.

The processing block 313 controls each block of the mobile telephone. The LCD monitor 315 displays a telephone number, contents of email, and an image or the like, of another party who is carrying out the communication. Here, the processing block 313 outputs to the power supply apparatus 332 a control signal expressing a voltage value to be supplied to the LED 321, as well as displaying an image or the like on the LCD monitor 315. The power supply apparatus 332 outputs voltage to an LED for a backlight included in the LCD monitor 315, based on the voltage value expressed by the control signal received from the processing block 313.

In a power supply apparatus as described in Patent Document 1, it has not been possible to appropriately set the boost ratio. However, in the power supply apparatus 100 according to the embodiment of the present invention, the boost ratio setting unit 2 sets the boost ratio XCP based on, in addition to the input voltage of the power supply apparatus 100 and the voltage to be supplied to the load 9, the margin voltage based on current to be supplied to the load 9. Accordingly, in the power supply apparatus 100 according to the embodiment of the present invention, it is possible to appropriately set the boost ratio and to stably supply the target voltage to the load 9.

Furthermore, in the power supply apparatus 100 according to the embodiment of the present invention, since the battery voltage Vbat is directly referred to, to set the boost ratio XCP, it is possible to set an appropriate boost ratio also for cases in which the battery voltage Vbat fluctuates. As a result, a problem in which the boost ratio is set to ×2 although it could adequately be set to ×1.5, is resolved, and thus it is possible to reduce wasted power consumption.

Furthermore, in a light emitting control circuit according to the embodiment of the present invention, the register circuit 4 outputs, to the constant current circuit 3, a current value to be supplied to the load 9, based on the control signal received from outside, and the configuration is such that the margin voltage, corresponding to the current value to be supplied to the load 9, is obtained from the conversion table 310, but there is no limitation thereto. A configuration is possible in which the boost ratio setting unit 2 receives, from the outside, a measured value of the current flowing in the load 9, without the light emitting control circuit being provided with a register circuit 4, or in which the current flowing in the load 9 is directly measured, and the margin voltage corresponding to this measured value is computed.

Furthermore, the power supply apparatus 100 according to the embodiment of the present invention has a configuration in which the charge pump circuit 1 is provided, but there is no limitation thereto, and as long as there is a boosting circuit by which the boost ratio can be changed, it is possible to replace the charge pump circuit 1.

Moreover, one LED only is shown as the load 9, but the present invention is valid in particular for a load that consumes a large current, such as a plurality of LEDs, motors, and the like.

In all points, the embodiments disclosed here are examples, and it should be borne in mind that there is no limitation thereto. The scope of the present invention is illustrated not by the abovementioned explanation but by the scope of the patent claims, and it is intended that the gist of the scope, equivalents, and the like, of the patent claims, and all modifications within the scope are included.

While the preferred embodiments of the present invention have been described using specific terms, such description is for illustrative purposes only, and it is to be understood that changes and variations may be made without departing from the spirit or scope of the appended claims.

The invention claimed is:

1. A power supply apparatus which performs voltage conversion of an input voltage, with a predetermined voltage as a target value, and outputs the converted voltage, the apparatus comprising:
    a charge pump circuit in which a plurality of boost ratios can be switched;
    a boost ratio setting unit which sets a boost ratio of the charge pump circuit based on the input voltage and a set voltage defining the target value; and
    a voltage adjustment unit which adjusts the input voltage so that the output voltage of the charge pump circuit approaches the predetermined voltage, and outputs to the charge pump circuit.

2. A power supply apparatus according to claim 1, further comprising:
    an output voltage setting unit which outputs the set voltage as a digital value; and
    an A/D converter which performs analog-digital conversion of the input voltage;
    wherein the boost ratio setting unit sets the boost ratio based on a result of comparing the input voltage that has undergone analog-digital conversion, and the predetermined voltage.

3. A power supply apparatus according to claim 1, wherein the voltage adjustment unit comprises:
    a transistor arranged between a terminal to which the input voltage is applied and an input terminal of the charge pump circuit; and an error amplifier which adjusts voltage of a control terminal of the transistor based on an error voltage between the output voltage and the set voltage.

4. A power supply apparatus according to claim 3, wherein the transistor is configured as a discrete component.

5. A power supply apparatus according to claim 3, wherein the transistor is configured as a package separate from other circuit elements that constitute the power supply apparatus.

6. An electronic device comprising:
a load circuit;
the power supply apparatus according to claim 1, which drives the load circuit; and
a drive controller which is arranged on a driving path of the load circuit and performs pulse modulation of a current flowing in the load circuit.

7. An electronic device according to claim 6, wherein the load circuit is a light emitting element, and the drive controller controls light emission intensity thereof.

8. An electronic device according to claim 6, wherein the load circuit is a plurality of light emitting elements, and the drive controller independently controls light emission intensity of each light emitting element.

9. A power supply apparatus, which performs voltage conversion of an input voltage, with a predetermined voltage as a target value, and outputs the converted voltage, the apparatus comprising:
the A/D converter configured to switch a plurality of inputted analog signals in a time division manner, and to convert the signals into digital signals, one of the plurality of inputted analog signals being the input voltage;
a charge pump circuit in which a plurality of boost ratios can be switched;
a third selector which operates in response to the first selector and the second selector and which switches between a digital signal which expresses the input voltage that is outputted from the A/D converter, and a digital signal which expresses an analog signal that is inputted to the power supply apparatus, outside of the input voltage;
a boost ratio setting unit which sets a boost ratio of the charge pump circuit based on the digital signal which expresses the input voltage selected by the third selector and the digital signal which expresses a set voltage that defines the target value; and
a voltage adjustment unit which adjusts the input voltage so that output voltage of the charge pump circuit approaches a predetermined voltage, and which outputs to the charge pump circuit, wherein the A/D converter comprises:
a first selector which selects one analog steal from the plurality of analog signals;
a second selector which operates in response to the first selector, and selects one reference voltage from a plurality of reference voltages; and
an A/D conversion unit which converts the analog signal selected by the first selector into a digital signal based on the reference voltage selected by the second selector.

10. An electronic device comprising:
a load circuit;
a sensor which outputs an analog signal; and
the power supply apparatus according to claim 9, which outputs a voltage, adjusted to a predetermined target value, to the load circuit, and outputs a digital signal for which an analog signal inputted from the sensor was A/D converted.

11. An electronic device according to claim 10 wherein the load circuit is a light emitting element.

12. An electronic device according to claim 10, wherein the sensor is a temperature sensor.

13. A power supply apparatus according to claim 9, wherein selection switching of the analog signal and the reference voltage is performed by providing a control signal to the first selector and the second selector.

14. A power supply apparatus according to claim 9, wherein the first selector and the second selector comprise an analog switch that is switched ON and OFF by the control signal.

15. A power supply apparatus comprising:
a boosting circuit which boosts an input voltage applied to an input terminal, and supplies the boosted voltage to a load; and
a boost ratio setting unit which sets a boost ratio based on the input voltage, a target value of voltage supplied to the load, and a current flowing in the load; wherein
the boosting circuit switches the boost ratio based on the setting, wherein the power supply apparatus further comprises:
a register circuit which outputs, to the boost ratio setting unit, a voltage drop value based on a current amount flowing in the load, occurring across a predetermined section in a path from the input terminal to the load, and wherein
the boost ratio setting unit sets the boost ratio based on the input voltage, the target value of the voltage supplied to the load, and the voltage drop value.

16. A power supply apparatus according to claim 15, wherein the register circuit notifies the boost ratio setting unit of the voltage drop value in the boosting circuit based on the current amount.

17. A power supply apparatus according to claim 15, wherein the load is a light emitting element used as a backlight of an LCD display device.

18. A power supply apparatus comprising:
a voltage adjustment unit which adjusts an input voltage applied to an input terminal;
a boosting circuit which boosts the adjusted voltage, and supplies the boosted voltage to a load; and
a boost ratio setting unit which sets a boost ratio of the boosting circuit;
wherein the boosting circuit performs output according to the adjusted voltage and the setting of the boost ratio setting unit.

19. A power supply apparatus according to claim 18, wherein the power supply apparatus further comprises:
an output voltage setting unit which sets a target value of voltage supplied to the load;
wherein the boost ratio setting unit sets the boost ratio based on the setting of the output voltage setting unit.

20. A power supply apparatus according to claim 18, wherein the power supply apparatus further comprises:
a conversion table which stores margin voltage corresponding to current flowing in the load, and wherein
the boost ratio setting unit sets the boost ratio so that a value which is: the margin voltage subtracted from a voltage value that is the voltage adjusted by the voltage adjusting unit, times the boosting ratio, does not go below a target value of the voltage supplied to the load; and
the voltage adjusting unit adjusts the input voltage so that output voltage of the boosting circuit becomes the target value of the voltage supplied to the load.

* * * * *